US012764554B2

(12) United States Patent
Xiu et al.

(10) Patent No.: US 12,764,554 B2
(45) Date of Patent: Oct. 13, 2026

(54) METHOD PERFORMED BY NETWORK NODE AND NETWORK NODE

(71) Applicant: SAMSUNG ELECTRONICS CO., LTD., Suwon-si (KR)

(72) Inventors: Deming Xiu, Beijing (CN); Yougang Huang, Beijing (CN); Ming Jin, Beijing (CN); Haokun Liu, Beijing (CN); Haoqiu She, Beijing (CN); Yuhan Hu, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 519 days.

(21) Appl. No.: 18/315,968

(22) Filed: May 11, 2023

(65) Prior Publication Data

US 2024/0107331 A1 Mar. 28, 2024

Related U.S. Application Data

(63) Continuation of application No. PCT/KR2023/005303, filed on Apr. 19, 2023.

(30) Foreign Application Priority Data

Sep. 28, 2022 (CN) ......................... 202211193893.7

(51) Int. Cl.

| | |
|---|---|
| ***H04W 16/18*** | (2009.01) |
| ***H04W 24/02*** | (2009.01) |
| ***H04W 24/08*** | (2009.01) |

(52) U.S. Cl.

CPC ........... *H04W 16/18* (2013.01); *H04W 24/02* (2013.01); *H04W 24/08* (2013.01)

(58) Field of Classification Search

CPC . H04W 16/14; H04W 28/0289; H04W 16/18; H04W 28/02; H04W 28/08;

(Continued)

(56) References Cited

U.S. PATENT DOCUMENTS 8,233,449 B2 7/2012 Agulnik et al.
8,995,255 B2 3/2015 Chou et al.

(Continued)

FOREIGN PATENT DOCUMENTS

CN 104484233 A * 4/2015
CN 107613565 1/2018

(Continued)

OTHER PUBLICATIONS

CN104484233A Translation (Year: 2015).*

(Continued)

*Primary Examiner* — Matthew C Sams
(74) *Attorney, Agent, or Firm* — NIXON & VANDERHYE P.C.

(57) ABSTRACT

The disclosure relates to a method performed by a network node, comprising acquiring cell capacity information of a plurality of cells corresponding to a Distributed Unit (DU) of a base station. The method comprises determining cell capacity summations corresponding to the DU based on each cell corresponding to different cell capacities, based on the cell capacity information. The method comprises determining a predicted cell capacity of the plurality of cells based on the cell capacity summations, for the base station allocating a cell capacity with respect to each of the plurality of cells according to the predicted cell capacity.

19 Claims, 31 Drawing Sheets

(58) Field of Classification Search
CPC ......... H04W 28/0284; H04W 72/1273; H04W 88/12; H04W 16/32; H04W 24/02; H04W 24/08; H04W 28/0942; H04W 4/70; H04W 72/046; H04W 72/1215; H04W 72/30; H04W 72/52; H04W 72/56; H04W 16/02; H04W 16/10; H04W 28/0215; H04W 28/0252; H04W 28/0268; H04W 28/0861; H04W 28/0867; H04W 28/0992; H04W 28/16; H04W 36/22; H04W 4/24; H04W 40/04; H04W 48/10; H04W 48/18; H04W 72/0453; H04W 72/51; H04W 72/542; H04W 76/20; H04W 8/04; H04W 88/06; H04W 88/08; H04W 88/18; H04W 92/20; H04L 47/11; H04L 47/83; H04L 1/0001; H04L 12/1407; H04L 12/1442; H04L 41/0631; H04L 41/0816; H04L 41/082; H04L 41/0823; H04L 41/147; H04L 41/5009; H04L 41/5019; H04L 41/5032; H04L 41/5041; H04L 41/5077; H04L 43/0864; H04L 43/0882; H04L 43/0888; H04L 43/0894; H04L 43/10; H04L 43/103; H04L 45/125; H04L 45/74; H04L 47/12; H04L 47/127; H04L 47/22; H04L 47/2483; H04L 47/28; H04L 47/781; H04L 5/001; H04L 5/0044; H04L 5/0053; H04L 5/0058; H04L 5/0064; H04L 5/0091; H04L 5/0098; H04L 67/10; G06F 9/45558; H04M 15/49; H04M 15/51; H04M 15/54; H04M 15/66; H04M 15/78; H04M 15/781; H04M 15/8038; H04M 15/805
See application file for complete search history.

(56) References Cited

U.S. PATENT DOCUMENTS 9,008,722 B2 * 4/2015 Tarraf ................... H04W 24/02 455/67.11
9,231,843 B2 * 1/2016 Chetlur ................. H04L 43/103
9,439,198 B2 9/2016 Inoue et al.
9,462,477 B2 * 10/2016 Ahmad ................. H04M 15/78
9,497,760 B2 11/2016 Johansson et al.
10,425,829 B1 * 9/2019 Cui ....................... H04W 16/14
10,812,992 B1 * 10/2020 Tran ...................... H04B 7/0695
11,153,801 B2 * 10/2021 Dowlatkhah ........... H04L 47/83
11,218,908 B2 1/2022 Choi et al.
2009/0075648 A1 * 3/2009 Reed ..................... H04W 24/02 455/424
2011/0158184 A1 * 6/2011 Agulnik ................ H04W 28/18 370/329
2011/0264805 A1 * 10/2011 Breitgand ........... G06F 9/45558 709/226
2012/0178483 A1 * 7/2012 Rosenau ............... H04W 28/16 455/509
2013/0023217 A1 1/2013 Zhuang et al.
2014/0148165 A1 * 5/2014 Serravalle ............. H04W 16/14 455/436
2015/0092576 A1 * 4/2015 Vaidya ................ H04L 41/5032 370/252
2017/0223626 A1 8/2017 Zhuang et al.
2018/0092100 A1 * 3/2018 Morioka ............... H04L 5/0098
2020/0021508 A1 * 1/2020 Kim .................... H04L 43/0888
2021/0314786 A1 * 10/2021 Liu ....................... H04W 16/32
2022/0264371 A1 * 8/2022 Strasman ................ H04L 47/28
2023/0020284 A1 * 1/2023 Soldati .................. H04L 5/0058
2025/0039864 A1 * 1/2025 Ren ................... H04W 72/1273
2025/0081270 A1 * 3/2025 Okamoto .............. H04W 28/08

FOREIGN PATENT DOCUMENTS

CN 103843381 B 5/2018
CN 115250274 A * 10/2022 ............. H04L 67/10
CN 119421194 A * 2/2025 ........ H04W 28/0942
KR 102111286 B1 6/2020
WO WO-2005096648 A1 * 10/2005 ............ H04W 16/32
WO 2013/145885 10/2013
WO 2015/194553 12/2015
WO WO-2023058089 A1 * 4/2023 ........ H04W 28/0289
WO WO-2023111945 A1 * 6/2023 ........ H04W 72/1273
WO WO-2024039372 A1 * 2/2024 ........... H04L 47/127

OTHER PUBLICATIONS

Search Report and Written Opinion dated Jul. 28, 2023 issued in International Patent Application No. PCT/KR2023/005303.
Gao et al. "RAN Centric Data Collection for New Radio", Sep. 2019, 8 pages.
Samsung,"Technical White Paper Virtualized RAN—vol. 2", Apr. 22, 2021, 17 pages.

* cited by examiner

METHOD PERFORMED BY NETWORK NODE AND NETWORK NODE

CROSS-REFERENCE TO RELATED APPLICATIONS

This application is a continuation of International Application No. PCT/KR2023/005303 designating the United States, filed on Apr. 19, 2023, in the Korean Intellectual Property Receiving Office and claiming priority to Chinese Patent Application No. 202211193893.7, filed on Sep. 28, 2022, in the Chinese Patent Office, the disclosures of which are incorporated by reference herein in their entireties.

BACKGROUND

Field

The disclosure relates to a field of wireless communication, for example, to a method performed by a network node and a network node, and a method performed by a base station and a base station.

Description of Related Art

In a 4G/5G system, a cell capacity configuration will impact a Central Processing Unit (CPU) resource usage rate of a Distributed Unit (DU) of a base station. At present, the cell capacity configuration is a static configuration, configuration values may allocate shared CPU resource equally among the respective cells, and the cell capacity configuration is determined when a worst case is met. However, the cell capacity configuration which is statically configured cannot change dynamically, but in an actual deployment scenario, cell capacity requirements change dynamically with time and space. As shown in FIG. 1, the cell capacity requirements change during the day and night. Therefore, the cell capacity configuration has an important impact on CPU resource usage and accessing to the cells by users.

Those skilled in the art have been trying to study a technical problem that, how to better make a cell capacity configuration to better meet communication requirements.

SUMMARY

According to an example embodiment of the present disclosure, there is provided a method performed by a network node, the method including: acquiring cell capacity related information of a plurality of cells corresponding to a Distributed Unit (DU) of a base station; and determining a predicted cell capacity of the plurality of cells based on the cell capacity related information, for the base station allocating a cell capacity with respect to each of the plurality of cells according to the predicted cell capacity.

According to an example embodiment, the determining the predicted cell capacity of the plurality of cells based on the cell capacity related information includes: determining cell capacity summations corresponding to the DU based on each cell corresponding to different cell capacities, based on the cell capacity related information; determining the predicted cell capacity of the plurality of cells, based on a cell capacity summation satisfying a set condition.

According to an example embodiment, the cell capacity summation satisfying the set condition includes a maximum cell capacity summation among the respective determined cell capacity summations.

According to an example embodiment, the cell capacity related information includes a target cell capacity.

According to an example embodiment, the determining the cell capacity summations corresponding to the DU based on each cell corresponding to the different cell capacities, based on the cell capacity related information, includes: determining a weight of each cell capacity parameter in a current cell capacity corresponding to each cell, based on a target cell capacity corresponding to each cell and the current cell capacity corresponding to each cell; and determining a current cell capacity summation corresponding to the DU, based on the current cell capacity corresponding to each cell and the weight of each cell capacity parameter in the current cell capacity corresponding to each cell.

According to an example embodiment, the target cell capacity of each cell is determined using an actual cell capacity of the corresponding cell in a current specified period and a target cell capacity of the corresponding cell estimated in a previous specified period.

According to an example embodiment, the determining the predicted cell capacity of the plurality of cells, based on the cell capacity summation satisfying the set condition, includes: determining whether a current cell capacity summation corresponding to the DU satisfies the set condition; based on the current cell capacity summation corresponding to the DU satisfying the set condition, determining the current cell capacity corresponding to each cell as the predicted cell capacity of the plurality of cells; based on the current cell capacity summation not corresponding to the DU satisfying the set condition, updating the current cell capacity corresponding to each cell, and determining a current cell capacity summation corresponding to the DU based on the updated current cell capacity of each cell.

According to an example embodiment, the determining whether the current cell capacity summation corresponding to the DU satisfies the set condition includes: confirming that the current cell capacity summation satisfies the set condition, based on the difference, between the current cell capacity summation corresponding to the DU and a cell capacity summation corresponding to the DU determined last time, not being greater than a set threshold, or the number of updates of cell capacities reaching an upper limit of the number of updates.

According to an example embodiment, the updating the current cell capacity corresponding to each cell includes: predicting a Central Processing Unit (CPU) resource occupied by each time sensitive module of processing modules of each cell, based on the current cell capacity corresponding to each cell; and updating the current cell capacity corresponding to each cell based on the predicted CPU resource occupied by each time sensitive module of each cell.

According to an example embodiment, the updating the current cell capacity corresponding to each cell based on the predicted CPU resource occupied by each time sensitive module of each cell, includes: updating the current cell capacity corresponding to each cell based on the CPU resource occupied by each time sensitive module of each cell not being greater than a corresponding upper limit of resource occupation.

According to an example embodiment, the predicting the CPU resource occupied by each time sensitive module in the processing modules of each cell, based on the current cell capacity corresponding to each cell, includes: using a neural network model to predict the CPU resource occupied by each time sensitive module in the processing modules of each cell, based on the current cell capacity corresponding to each cell.

According to an example embodiment, the method further includes: determining idle CPU resource of the DU based on the predicted cell capacity of the plurality of cells, for the base station allocating CPU resource with respect to time insensitive modules of the plurality of cells according to the idle CPU resource.

According to an example embodiment, the determining the idle CPU resource of the DU based on the predicted cell capacity of the plurality of cells includes: using a neural network model to determine CPU resource occupied by time sensitive modules in the processing modules of each cell, based on the predicted cell capacity of the plurality of cells; determining the idle CPU resource of the DU based on the CPU resource occupied by the time sensitive modules and start time of running of the time sensitive modules.

According to an example embodiment, the determining the idle CPU resource of the DU includes: determining an end time of running of the time sensitive modules, based on the CPU resource occupied by the time sensitive modules and a start time of running of the time sensitive modules; determining the idle CPU resource, based on the start time and the end time of running of the time sensitive modules adjacent in time sequence.

According to an example embodiment, the method further includes: training the neural network model based on an actual cell capacity of each cell and information on the occupied CPU resource corresponding to the actual cell capacity.

According to an example embodiment, the cell capacity includes at least one of: a maximum supportable User Equipment (UE) number; a maximum supportable UE number with Sounding Reference Signal (SRS) configuration; a maximum supportable Multi-User (MU) scheduling candidate UE number; a maximum supportable MU layer number.

According to an example embodiment, the network node includes a base station, a Radio Access Network Intelligent Controller (RIC) in an Open Radio Access Network (O-RAN).

According to an example embodiment, the acquiring the cell capacity related information of the plurality of cells corresponding to the DU of the base station includes: acquiring the cell capacity related information of the corresponding plurality of cells from the DU of the base station, wherein the method further includes: transmitting the predicted cell capacity to the base station, for the base station allocating the cell capacity with respect to each of the plurality of cells according to the predicted cell capacity.

According to an example embodiment, the cell capacity related information includes at least one of: an actual cell capacity of a cell, the information on the occupied CPU resource corresponding to the actual cell capacity, and a target cell capacity of the cell.

According to an example embodiment of the present disclosure, there is provided a method performed by a base station, including: acquiring a predicted cell capacity of a plurality of cells corresponding to a Distributed Unit (DU) of the base station, determined based on the cell capacity related information of the plurality of cells corresponding to the DU; and allocating a cell capacity with respect to each of the plurality of cells according to the predicted cell capacity.

According to an example embodiment, the allocating the cell capacity with respect to each of the plurality of cells according to the predicted cell capacity includes: determining a priority of each of the plurality of cells corresponding to the DU; and allocating a cell capacity with respect to each cell, using the predicted cell capacity, according to the priority of each cell.

According to an example embodiment, the allocating the cell capacity with respect to each cell, using the predicted cell capacity, according to the priority of each cell, includes: according to the priority of each cell, performing, with respect to each cell successively: based on a priority of a current cell being a high priority, or based on the priority of the current cell being low priority and the remaining CPU resource not being less than a specified threshold, allocating a cell capacity for the current cell based on the predicted cell capacity, and updating the remaining CPU resource; based on the priority of the current cell being a low priority and the remaining CPU resource being less than the specified threshold, determining an updated cell capacity of the current cell based on the remaining CPU resource, allocating the cell capacity for the current cell based on the updated cell capacity, and updating the remaining CPU resource.

According to an example embodiment, the method further includes: acquiring idle CPU resource of the DU, determined based on the predicted cell capacity; allocating the idle CPU resource of the DU with respect to time insensitive modules in the processing modules of each cell, according to the idle CPU resource of the DU.

According to an example embodiment, the allocating the idle CPU resource of the DU with respect to the time insensitive modules in the processing modules of each cell, according to the idle CPU resource of the DU, includes: splitting time insensitive modules in the processing modules of each cell to obtain a plurality of time insensitive sub-modules for the plurality of cells; and allocating the idle CPU resource of the DU with respect to each of the plurality of time insensitive sub-modules, according to the idle CPU resource of the DU.

According to an example embodiment of the present disclosure, there is provided a network node, including: a transceiver; and a processor coupled to the transceiver and configured to perform operations performed by the network node as described above.

According to an example embodiment of the present disclosure, there is provided a base station, including: a transceiver; and a processor coupled to the transceiver and configured to operations performed by the base station as described above.

According to an example embodiment of the present disclosure, there is provided an electronic apparatus, including: at least one processor; and at least one memory storing computer executable instructions, wherein the computer executable instructions, when executed by the at least one processor, cause the at least one processor to perform the operations as described above.

According to an example embodiment of the present disclosure, there is provided non-transitory computer-readable storage medium storing instructions, wherein the instructions, when executed by at least one processor, cause the at least one processor to perform operations as described above.

According to embodiments, a method performed by a network node, comprises acquiring cell capacity information of a plurality of cells corresponding to a Distributed Unit (DU) of a base station. The method comprises determining cell capacity summations corresponding to the DU based on each cell corresponding to different cell capacities, based on the cell capacity information. The method comprises determining a predicted cell capacity of the plurality of cells based on the cell capacity summations, for the base station allocating a cell capacity with respect to each of the plurality of cells according to the predicted cell capacity.

According to embodiments, a device of a network node, comprises at least one transceiver. The device comprises at least one processor coupled to the at least one transceiver. The at least one processor is configured to acquire cell capacity information of a plurality of cells corresponding to a Distributed Unit (DU) of a base station. The at least one processor is configured to determine cell capacity summations corresponding to the DU based on each cell corresponding to different cell capacities, based on the cell capacity information. The at least one processor is configured to determine a predicted cell capacity of the plurality of cells based on the cell capacity summations, for the base station allocating a cell capacity with respect to each of the plurality of cells according to the predicted cell capacity.

According to embodiments, a non-transitory computer-readable storage medium having stored thereon program instructions, the instructions, when executed by a processor, perform operations includes acquiring cell capacity information of a plurality of cells corresponding to a Distributed Unit (DU) of a base station. The instructions, when executed by the processor, perform operations includes determining cell capacity summations corresponding to the DU based on each cell corresponding to different cell capacities, based on the cell capacity information. The instructions, when executed by a processor, perform operations includes determining a predicted cell capacity of the plurality of cells based on the cell capacity summations, for the base station allocating a cell capacity with respect to each of the plurality of cells according to the predicted cell capacity.

The beneficial effects of the various example embodiments of the present disclosure will be described in greater detail below in combination with various example embodiments.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Embodiments of the present disclosure are described below in conjunction with the accompanying drawings. It should be understood that the embodiments described below in combination with the accompanying drawings are merely example descriptions for explaining the embodiments of the present disclosure, and are no to be considered as restrictions on the various embodiments of the present disclosure.

It may be understood by those skilled in the art that singular forms "a", "an", "the" and "this" used herein may also include plural forms unless specifically stated. It should be further understood that the terms "include" and "comprise" used in the embodiments of the present disclosure may refer to a corresponding feature being implemented as the presented feature, information, data, step, operation, element, and/or component, but do not exclude implement of other features, information, data, steps, operations, elements, components and/or a combination thereof, which are supported in the present technical field. It should be understood that, when we state that one element is "connected" or "coupled" to another element, this element may be directly connected or coupled to the another element, or it may refer to a connection relationship between this element and the another element being established through an intermediate element. In addition, "connection" or "coupling" used herein may include a wireless connection or wireless coupling. The term "and/or" used herein represents at least one of items defined by this term, for example, "A and/or B" may be implemented as "A", or "B", or "A and B". When describing a plurality of (two or more) items, if a relationship between the plurality of items is not clearly defined, between the plurality of items may refer to one, more or all of the plurality of items. For example, for a description of "a parameter A includes A1, A2, A3", it may be implemented that the parameter A includes A1, or A2, or A3, and it may also be implemented that the parameter A includes at least two of the three parameters A1, A2, A3.

As described above, in the 4G/5G system, the cell capacity configuration will impact the CPU resource usage rate of the DU, wherein the cell capacity configuration includes at least one of the following cell capacity parameters:

1. A maximum supportable User Equipment (UE) number, also known as Radio Resource Control (RRC)-UE: this parameter impacts the CPU resource usage rate and whether a UE can access a cell;
2. A maximum supportable UE number with Sounding Reference Signal (SRS-UE) configuration: this parameter impacts the CPU resource usage rate and cell throughput;
3. A maximum supportable Multi-User (MU) scheduling candidate UE number, also known as Semi-orthogonality User Selection (SUS)-UE: this parameter impacts the CPU resource usage rate and cell throughput; and
4. A maximum supportable MU-layer number: this parameter impacts the CPU resource usage rate and the cell throughput.

Figure 1:
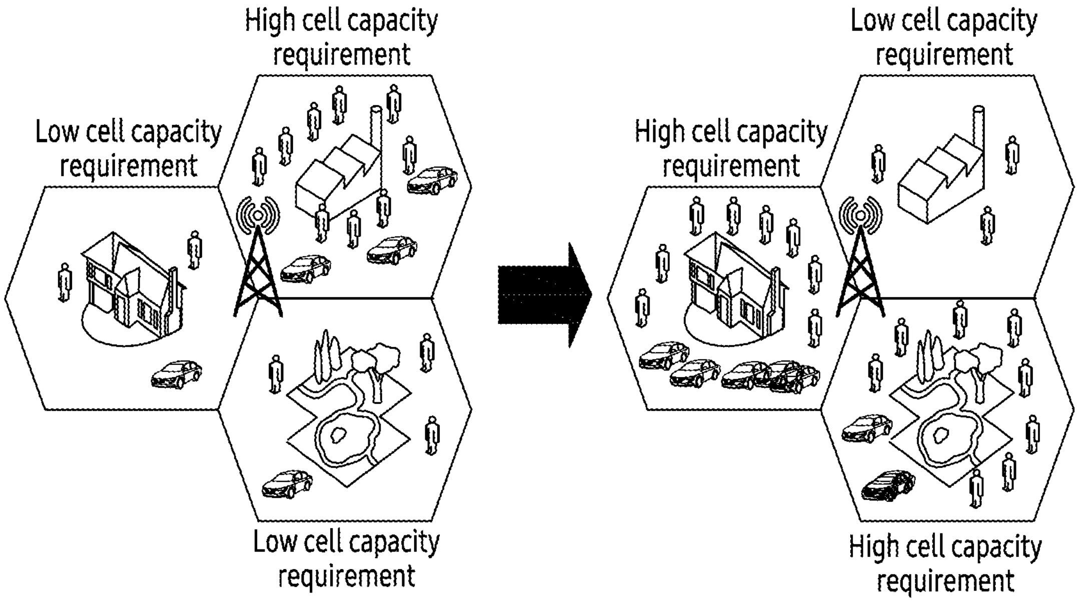
FIG. 1 is a diagram illustrating cell capacity requirement changes.
Figure 2:
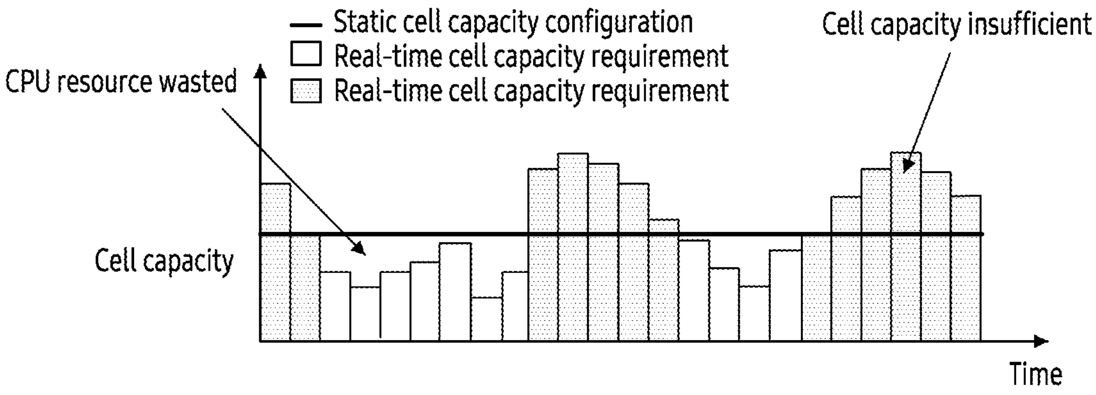
FIG. 2 is a bar graph illustrating a relationship between a static cell capacity configuration and real-time cell capacity requirements.

At present, the cell capacity configuration is a static cell capacity configuration, but the static cell capacity configuration cannot adapt to dynamic changes of the real-time cell capacity requirements as shown in FIG. 1, and then there are the following problems:

1. When cell capacity requirements are lower than the cell capacity configuration (as shown in blank histogram portions in FIG. 2), CPU resource is wasted, resulting in an increase in hardware cost of a single cell;
2. When the cell capacity requirement is higher than the cell capacity configuration (as shown in the gray histogram portions in FIG. 2), the cell capacity is insufficient, that is, the real-time cell capacity requirement cannot be met, resulting in some UEs unable to access the cell or reducing the cell throughput.

In addition, the static cell capacity configuration is obtained by testing the CPU resource usage rate via traversing combinations of multiple configuration parameters. This configuration scheme also has a problem of high complexity. Since the number of combinations of configuration parameters is too many, thereby leading to excessive time cost in test process of the CPU resource usage rate and high labor cost. In addition, when the code changes (such as characters are newly added or functions are enhanced), the existing static cell capacity configuration will become invalid, and the above test process needs to be repeated, for a case of a certain cell as shown in Table 1 below:

TABLE 1

| | Number of candidate parameters in a ideal case | Down-sampling rate | Number of candidate parameters after down-sampling |
|---|---|---|---|
| RRC-UE | 600 | 200 | 3 |
| SRS-UE | 256 | 32 | 8 |
| SUS-UE | 64 | 8 | 8 |
| MU_Layer | 16 | 2 | 8 |
| Number of combinations | 157286400 | | 1536 |

For example, for this cell, if the above four cell capacity parameters are not down-sampled, the maximum 157286400 cell capacity configurations need to be tested, that is, the 157286400 combinations of cell capacity parameters needs to be tested, a total test amount will grow geometrically when each DU includes plurality of cells. The above configuration scheme cannot be applied to a normal system development, the above four cell capacity parameters need to be down-sampled (that is, only some of them are selected for testing), but this will greatly reduce an accuracy of the cell capacity configuration.

Figure 3:
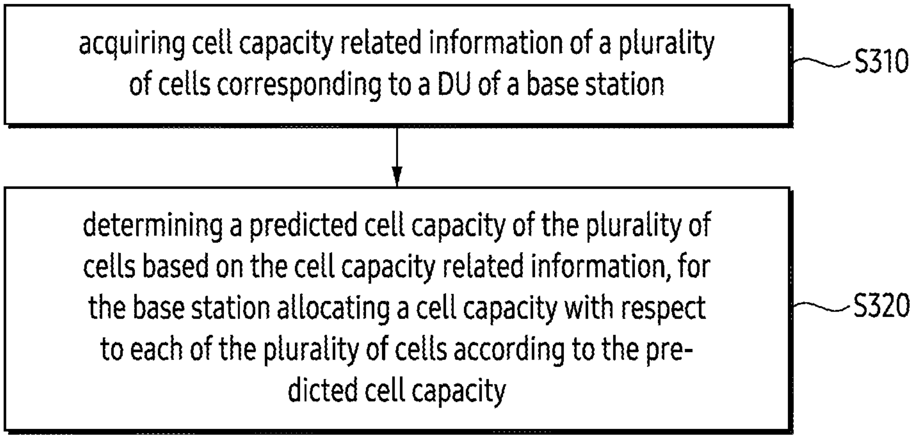
FIG. 3 is a flowchart illustrating an example method performed by a network node according to various embodiments.

FIG. 3 is a flowchart illustrating an example method performed by a network node according to various embodiments. The network node may be the next generation base station (gNB, also called a base station, a data unit, etc.), a Radio Access Network Intelligent Controller (RIC) in an Open Radio Access Network (O-RAN), or a general CPU supporting general complex computing. For example, a network node may be an Artificial Intelligence (AI) server. The network node may receive various information from other network nodes (such as, the base station), determine a cell capacity according to the received information, and send the determined cell capacity to the base station, or the network node itself may be a base station, and may collect various information, determine the cell capacity according to the received information, and allocate the cell capacity with respect to each cell based on the determined cell capacity. According to an embodiment, the "cell capacity(s)" mentioned here has the same meaning as the "cell capacity configuration(s)" mentioned above, and may be used interchangeably. The DU according to various embodiments may also be referred to as a Digital Unit.

As shown in FIG. 3, in operation S310, cell capacity related information of a plurality of cells corresponding to a DU of a base station is acquired.

In an example embodiment, the cell capacity related information may include processing module constraints (also known as software module constraints) of processing modules (e.g., software modules) for each cell installed on the DU, wherein the processing module constraints include at least one of: an identification (ID) of a processing module, a type of the processing module, a constraint format representing a CPU resource constraint, a start time of running of the processing module, an end time of running of the processing module, a running duration of the processing module, wherein the type of the processing module type that the processing module is one of a time critical module, a non time critical module and a time insensitive module.

In an example embodiment, when the network node performing the method is a base station, when the network node (for example, the base station) is started, the processing module constraint of each processing module of each cell is acquired locally, wherein the processing modules for each cell installed on the DU are classified into time critical modules, non time critical modules and time insensitive modules according to time sensitivity, wherein the time critical modules and non time critical modules may be called as time sensitive modules. In an embodiment, when the network node performing the method is a network apparatus (for example, a RIC in an O-RAN) other than the base station, the network node may acquire the processing module constraint of each processing module of each cell from the base station (for example, the DU of the base station).

For example, one DU of the base station may correspond to the plurality of cells, and processing modules (software modules) for the plurality of cells are installed on this DU. When the base station is started, these cells are established, and then, the processing modules for these cells will use the CPU resource of the DU as required. The DU may classify the processing modules for each cell installed on the DU, into the time sensitive modules and the time insensitive modules according to degrees of time sensitivity of the processing modules, wherein the time insensitive module represents a module that is insensitive to time, which has a low priority in using the CPU resource, and this module may use idle CPU resource to complete tasks; the time sensitive module represents a module that is sensitive to time, which has a high priority in using the CPU resource, and time when this module occupies the CPU resource during running is less than or equal to a preset upper limit, wherein the preset upper limit may be less than or equal to one Transmission Time Interval (TTI).

The time sensitive modules may be further classified into time critical modules and non time critical modules according to degrees of time sensitivity, wherein the time critical module represents a module: whose time when it occupies the CPU resource during running is less than or equal to a preset upper limit, which is less than one TTI, and there are strict requirements on a start time and an end time during running of this module, in addition, each module may have different time upper limits; the non time critical module represents a module: whose time when it occupies the CPU resource during running is less than or equal to a preset upper limit, which is equal to one TTI. In other words, constraints on the non time critical modules focus more on a running duration when the CPU resource is occupied during running (that is, the running duration is less than or equal to one TTI), however, constraints on the time critical modules focus more on the start time and the end time during running In addition, for different cells under the DU, a set of the processing modules on the DU is not identical. For example, one cell may have two time critical modules, one non time critical module and one time insensitive module, however, another cell may have one time critical module and one non time critical module, but have no time insensitive module.

The network node may acquire the processing module constraint of each processing module, for example, the processing module constraint may be acquired in a format shown in Table 2 below.

TABLE 2

| Module ID | Module Type | Format | CPU Resource Constraint |
|---|---|---|---|
| Module#1 | Time critical module | Format 1 | a running duration ≤ a first preset upper limit (<1 TTI) |
| Module#2 | Non time critical module | Format 2 | a running duration ≤ 1 TTI |
| Module#3 | Time critical module | Format 4 | a running duration ≤ a second preset upper limit (<1 TTI) |
| . . . | . . . | . . . | . . . |
| Module#N | Time insensitive module | Format 0 | — |
| — | — | Format K | $\Sigma$processing_time$_k$ < max_cpu_resource |

In Table 2, each processing module has a corresponding module ID to identify each processing module. Each processing module is classified into one module type, e.g., a time critical module, a non time critical module or a time insensitive module. Each processing module has a corresponding constraint format, and even two processing modules with the same module type may have different constraint formats. For example, although Module#1 and Module#3 have the same module type (that is, both are time critical modules), the constraint format of Module#1 is format 1, and the constraint format of Module#3 is format 3. Each constraint format represents a corresponding CPU resource constraint. For example, a CPU resource constraint in format 1 has specific requirements for the start time and the running duration (for example, the start time is 0.1 TTI, and the running duration is less than the first preset upper limit (the upper limit is less than 1 TTI), and a CPU resource constraint in format 3 has specific requirements for the end time and the running duration (for example, the end time is 0.5 TTI, and the running duration is less than the second preset upper limit (the upper limit is less than 1 TTI)). As for time insensitive modules, the constraint formats thereof may be set to one unified format, for example, format 0 may refer, for example, to there being no specific constraint on the CPU resource, e.g., their start time, end time, and running duration may be any value. Format K is used to represent that a summation of time when processing modules installed on a DU for plurality of cells occupy the CPU resource needs to be less than the maximum CPU resource (max_cpu_resource), wherein processing_time$_k$ represents the time when a processing module k occupies the CPU resource, k is an integer greater than or equal to 1 and less than or equal to K, wherein K is the number of processing modules of plurality of cells, max_cpu_resource=num_of_cpu_cores×TTI_length×cpu_main_frequency, wherein num_of_cpu_cores represents the number of CPU cores of the DU, TTI_length represents a length of one TTI, and cpu_main_frequency represents a CPU total frequency. However, Table 2 is only used for one example of the processing module constraint, and the disclosure is not limited to this. The processing module constraint may be represented in any form as long as this form may reflect information similar to that contained in Table 2.

In addition, the cell capacity related information includes at least one of an actual cell capacity of a cell, information on the occupied CPU resource corresponding to the actual cell capacity, and a target cell capacity of the cell.

In an embodiment, when the network node performing the method is a base station, after the network node (for example, the base station) is started, the actual cell capacity of each cell of the DU for this preset period, the information on the occupied CPU resource corresponding to the actual cell capacity, and the target cell capacity of each cell estimated by the DU with respect to this preset period, are acquired according to the preset period.

For example, after the network node (e.g., the base station) is started, the network node collects the actual cell capacity and the actually occupied CPU resource (e.g., the occupied CPU resource corresponding to the actual cell capacity) of each cell, and then they are used for training a neural network model to be used subsequently. The actual cell capacity of one cell may be represented as a set of {RRC-UE, SRS-UE, SUS-UE, MU-Layer}; the actual occupied CPU resource corresponds to this actual cell capacity, which represents a situation of the CPU resource occupied by the processing modules for the cell installed on the DU. For example, the actual CPU resource occupied by the cell may be represented as {Module#1=xxx(CPU cycles), Module#2=xxx(CPU cycles), . . . }. In the present disclosure, with respect to a plurality of cells corresponding to one CPU resource pool of the DU, the actual cell capacity of each cell and the corresponding actual occupied CPU resource are collected. In addition, the network node collects them according to a preset period (such as 10 TTIs), for example, collects the actual cell capacity of each cell and the information on the occupied CPU resource corresponding to the actual cell capacity in the preset period (such as 10 TTIs), for subsequent training of the neural network model.

In addition, when obtaining the actual cell capacity and the corresponding actual occupied CPU resource, it is also necessary to obtain the target cell capacity of each cell estimated for this preset period (for example, 10 TTIs). In an embodiment, the target cell capacity of each cell is determined using the actual cell capacity of the corresponding cell in this preset period and the target cell capacity estimated in the last preset period.

For example, the target cell capacity of each cell may be determined according to the following equation (1):

$$\text{target\_cell\_capacity\_cur}\#c = \alpha\times\text{target\_cell\_capacity\_pre}\#c + (1-\alpha)\times\text{real\_cell\_capacity}\#c \tag{1}$$

Where, target_cell_capacity_cur#c represents a target cell capacity of a c-th cell in this preset period, target_cell_capacitypre#c represents a target cell capacity of the c-th cell in the last preset period, real_cell_capacity#c represents an actual cell capacity of the c-th cell in this preset period, α represents a configured coefficient, which is set, for example, α may be set to 0.6, but the disclosure is not limited to this.

In addition, when determining a target cell capacity of one cell for the first time after the network node is started, since there is no target cell capacity of the corresponding cell estimated with respect to the last preset period, the actual cell capacity of this preset period is set as the target cell capacity of this preset period.

In an embodiment, when the network node performing the method is a network apparatus (for example, a RIC in an O-RAN) other than the base station, after the base station is started, the network node acquires, from the base station (for example, the DU of the base station) in the preset period, the actual cell capacity of each cell of the DU in this preset period and the information on the occupied CPU resource corresponding to the actual cell capacity, and the target cell capacity of each cell estimated by the DU with respect to this preset period.

Figure 4:
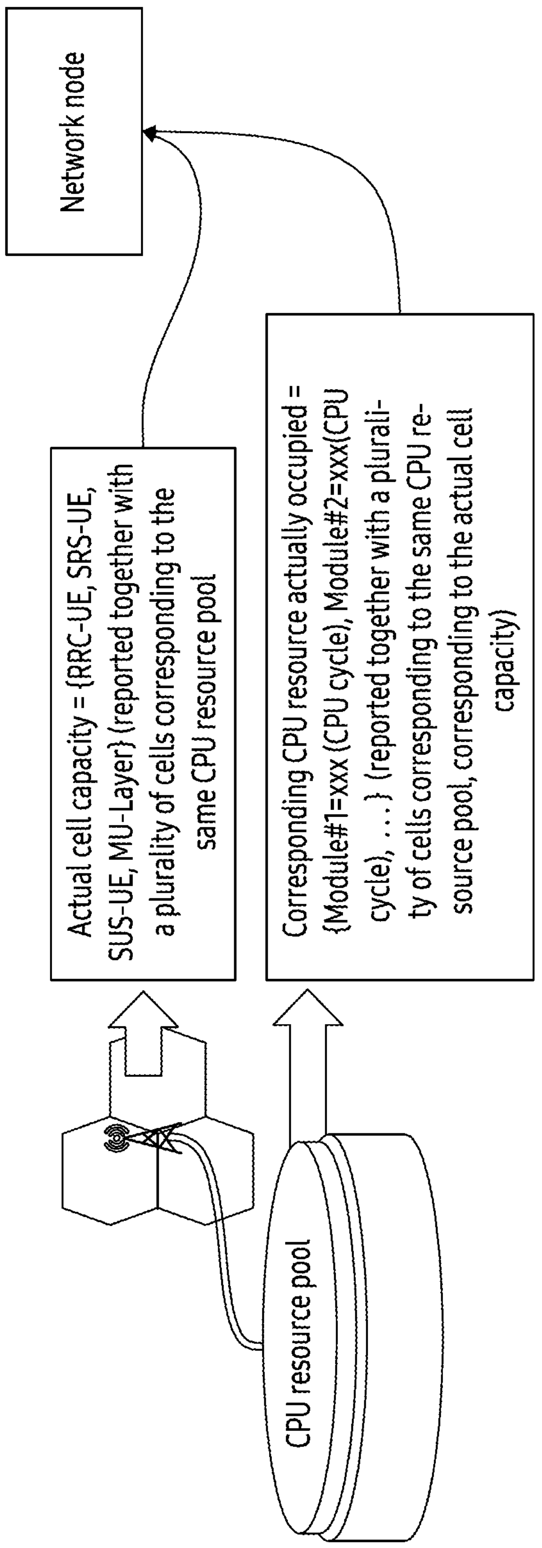
FIG. 4 is a diagram illustrating an example process of DU reporting an actual cell capacity and corresponding actual occupied CPU resource to the network node according to various embodiments.

For example, after the base station is started, the DU collects the actual cell capacity and the actually occupied CPU resource of each cell (that is, the occupied CPU resource corresponding to the actual cell capacity), and then reports the same to the network node, for training of the neural network model to be used subsequently. In addition, according to various embodiments, with respect to the plurality of cells corresponding to one CPU resource pool of the DU, the base station reports the actual cell capacity of each cell and the information on the occupied CPU resource corresponding to the actual cell capacity collected in each preset period to the network node together, according to the preset period. As shown in FIG. 4, the base station (such as, the DU) reports the actual cell capacities of a plurality of cells corresponding to the same CPU resource pool together with the corresponding actual occupied CPU resource to the network node. In addition, when acquiring the actual cell capacity and the corresponding actual occupied CPU resource, the network node also needs to acquire the target cell capacity of each cell estimated with respect to this preset period (for example, 10 TTIs) from the base station. Since the target cell capacity have been described in detail above, this will not be repeated here.

When the network node is a network apparatus (for example, a RIC in an O-RAN) other than the base station, the step of obtaining the cell capacity related information of a plurality of cells corresponding to the DU of the base station may include: obtaining the cell capacity related information of the corresponding plurality of cells from the DU of the base station.

Referring back to FIG. 3, in operation S320, a predicted cell capacity of the plurality of cells is determined based on the cell capacity related information, for the base station allocating a cell capacity with respect to each of the plurality of cells according to the predicted cell capacity. This is described in greater detail below with reference to FIG. 5.

Figure 5:
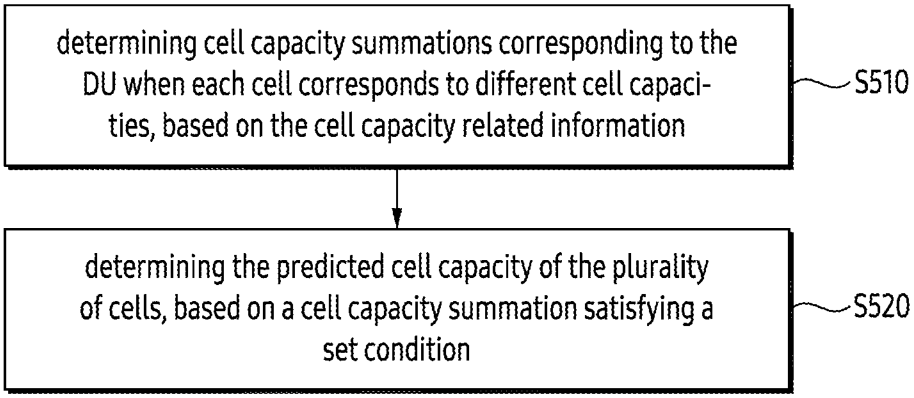
FIG. 5 is a flowchart illustrating an example process of determining a predicted cell capacity of the plurality of cells based on cell capacity related information according to various embodiments.

FIG. 5 is a flowchart illustrating an example process of determining the predicted cell capacity of the plurality of cells based on the cell capacity related information according to various embodiments.

Figure 6:
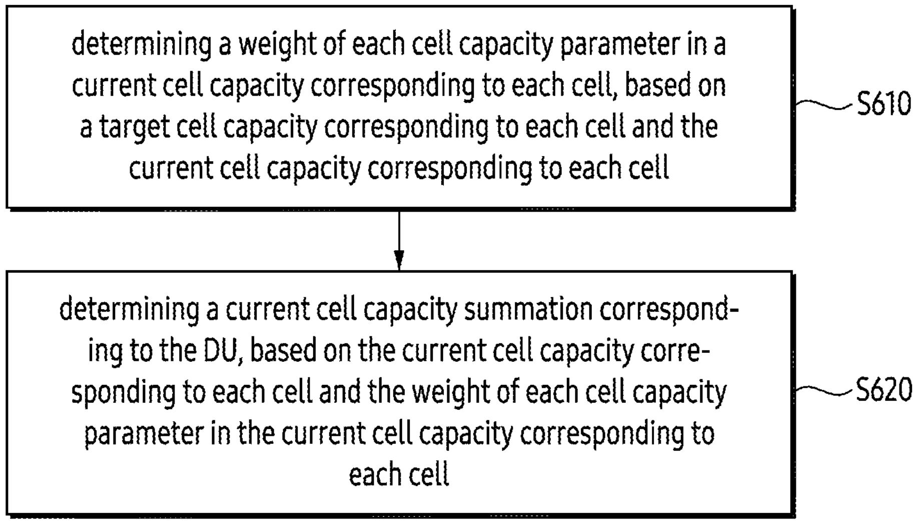
FIG. 6 is a flowchart illustrating an example process of determining a cell capacity summation corresponding to the DU when each cell corresponds to one cell capacity according to various embodiments.

As shown in FIG. 5, first, in operation S510, cell capacity summations corresponding to the DU when each cell corresponds to different cell capacities are determined, based on the cell capacity related information. The process of the cell capacity summation corresponding to the DU when each cell corresponds to one cell capacity will be described in greater detail below with reference to FIG. 6. FIG. 6 is a flowchart illustrating an example process of determining a cell capacity summation corresponding to the DU when each cell corresponds to one cell capacity according to various embodiments.

Although not shown in FIG. 6, in an embodiment, an initialization process is completed when the process of FIG. 6 is carried out.

For example, first, a temp cell capacity of the plurality of cells is set. For example, the temp cell capacity of the plurality of cells may be set according to the target cell capacity of each cell acquired in the operation S310. For example, a total target cell capacity target_cell_capacity of the plurality of cells is set using the acquired target cell capacity of each cell. In detail, the acquired target cell capacity of each cell is one parameter set including F cell capacity parameters, wherein F is a positive integer greater than or equal to 1. In the above example, F is 4, that is, the parameter set is {RRC-UE, SRS-UE, SUS-UE, MU-Layer}, therefore, when the DU controls the plurality of cells (for example, C cells), the acquired target cell capacity of each of these C cells may be used to form one parameter set target_cell_capacity (e.g. the total target cell capacity) containing N=F×C cell capacity parameters, wherein the n-th parameter in the parameter set may be represented as target_cell_capacity#n, wherein n is an integer greater than or equal to 1 and less than or equal to N. At this point, a temp cell capacity temp_cell_capacity with the same number of parameters as the total target cell capacity target_cell_capacity may be defined, and the initial temp cell capacity temp_cell_capacity may be set to be the same as the total target cell capacity target_cell_capacity. However, the disclosure does not make a specific definition on the method of setting the initial temp cell capacity temp_cell_capacity. For example, the initial temp cell capacity temp_cell_capacity may be set to other values.

In addition, in this initialization process, it is also needed to set a weight for each cell capacity parameter in the temp cell capacity. For example, a weight array weight may be set, length of which is N, that is, a total number of cell capacity parameters of the plurality of cells sharing the same CPU resource pool under the DU, e.g., N=F×C. As mentioned above, F represents the number of cell capacity parameters of each cell, C represents the number of cells sharing the same CPU resource pool under the DU, and the n-th weight (weight#n) in this weight array weight corresponds to the n-th parameter temp_cell_capacity#n in the temp cell capacity temp_cell_capacity, and an initial value of weight#n is equal to 1/N. In addition, in order to continuously update the weight array weight subsequently, a basic operation Size basic_step is also set, which may be flexibly adjusted, for example, the basic operation Size basic_step may be set to 0.2, but the disclosure is not limited to this.

Based on the initialization, in operation S610, a weight of each cell capacity parameter in a current cell capacity corresponding to each cell is determined, based on a target cell capacity corresponding to each cell and the current cell capacity corresponding to each cell.

In an embodiment, the current cell capacity corresponding to each cell represents a temporary cell capacity of the cell when describing each cell. The current cell capacity of each cell in the plurality of cells may include the temp cell capacity mentioned in the above initialization process together. For example, if there are three cells, the current cell capacity of each cell is configured by four cell capacity parameters, the temp cell capacity may be represented as a parameter set including 12 cell capacity parameters of the three cells. In this case, since the temp cell capacity includes the cell capacity parameters of the current cell capacity of each cell, in other words, determining the weight of each cell capacity parameter in the current cell capacity corresponding to each cell is to determine the weight of each cell capacity parameter in the temp cell capacity.

For example, based on the above initialization, a difference of the n-th cell capacity parameter in the temp cell capacity is determined according to the following equation (2):

$$diff\#n = \text{target\_cell\_capacity}\#n - \text{temp\_cell\_capacity}\#n \tag{2}$$

A weight#n corresponding to the n-th cell capacity parameter in the temp cell capacity is updated according to the following equation (3):

$$\text{weight}\#n = \text{weight}\#n + \text{basic\_step} \times diff\#n / N \tag{3}$$

Wherein, when the n-th cell capacity parameter temp_cell_capacity#n in the temp cell capacity is less than the n-th cell capacity parameter target_cell_capacity#n in the total target cell capacity, diff#n is positive, and accordingly, weight#n will be increased, and the greater the difference between temp_cell_capacity#n and target_cell_capacity#n, the greater the increase extent of the weight weight#n; conversely, when temp_cell_capacity#n is greater than target_cell_capacity#n, the weight weight#n will be reduced accordingly.

In addition, based on determining each weight in the weight array weight according to the equations (2) and (3) above, with respect to each weight, a normalized process may be performed according to the following equation (4):

$$\text{weight}\#n = \text{weight}\#n / \sum_{n=1}^{N} \text{weight}\#n \tag{4}$$

The weight of each cell capacity parameter in the current cell capacity corresponding to each cell may be determined.

In operation S620, a current cell capacity summation corresponding to the DU is determined, based on the current cell capacity corresponding to each cell and the weight of each cell capacity parameter in the current cell capacity corresponding to each cell.

As described above, the temp cell capacity is composed of the current cell capacity corresponding to each cell. Therefore, in an embodiment, the current cell capacity summation corresponding to the DU is determined according to the current cell capacity of each of the plurality of cells, therefore, it may also be referred to as a weighted summation of the temp cell capacity.

For example, determine the current cell capacity summation (e.g., the weighted summation of the temp cell capacity) capacity_sum corresponding to the DU according to the following equation (5):

$$\text{capacity\_sum} = \sum_{n=1}^{N} \text{weight}\#n \times \text{temp\_cell\_capacity}\#n \tag{5}$$

Wherein, temp_cell_capacity#n represents the n-th cell capacity parameter in the temp cell capacity, and weight#n represents a weight corresponding to the n-th cell capacity parameter.

The process of determining the current cell capacity summation corresponding to the DU (that is, the weighted summation of the temp cell capacity) when each cell corresponds to one cell capacity (that is, each cell capacity parameter in the temp cell capacity takes one corresponding value) is described above, however, in order to determine the optimal temp cell capacity, it is needed to continuously update each cell capacity parameter in the temp cell capacity (even if each cell corresponds to different cell capacities) to obtain the corresponding cell capacity summation (that is, the weighted summation of the temp cell capacity). That is, it is needed to determine the cell capacity summation (that is, the weighted summation of the temp cell capacity) corresponding to the DU when each cell corresponds to different cell capacities. The update process will be described in the following operation S520.

Referring back to FIG. 5, in operation S520, the predicted cell capacity of the plurality of cells is determined, based on a cell capacity summation satisfying a set condition. This will be described in greater detail below with reference to FIG. 7.

Figure 7:
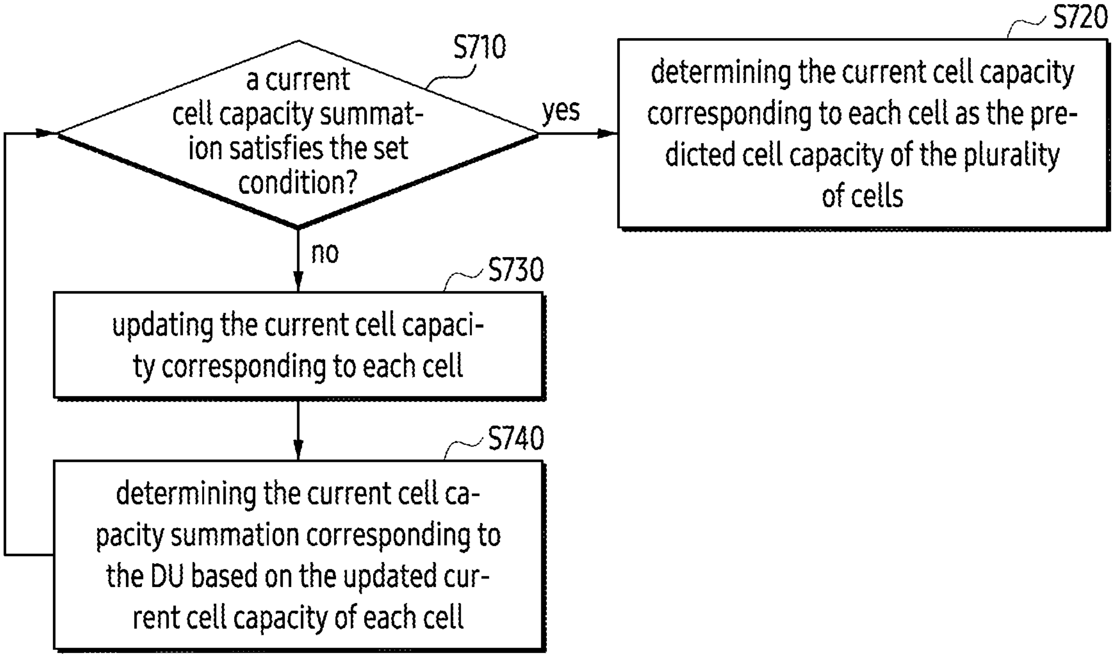
FIG. 7 is a flowchart illustrating an example process of determining the predicted cell capacity of the plurality of cells based on a cell capacity summation satisfying a set condition according to various embodiments.

FIG. 7 is a flowchart illustrating an example process of determining the predicted cell capacity of the plurality of cells based on a cell capacity summation satisfying a set condition according to various embodiments.

Referring to FIG. 7, in operation S710, whether a current cell capacity summation corresponding to the DU satisfies the set condition is determined.

For example, based on determining the cell capacity summation corresponding to the DU when each cell corresponds to one cell capacity with reference to FIG. 6 above, it is needed to determine whether the cell capacity summation satisfies the set condition. The determining whether the current cell capacity summation corresponding to the DU satisfies the set condition includes: confirming that the current cell capacity summation satisfies the set condition, when the difference, between the current cell capacity summation corresponding to the DU and a cell capacity summation corresponding to the DU determined last time, is not greater than a set threshold, or the number of updates of cell capacities reaches an upper limit of the number of updates.

For example, if the following conditional judgment (6) is not valid, it represents that the current cell capacity summation satisfies the set condition, and it proceeds to operation S720:

$$\text{capacity\_sum\#}l - \text{capacity\_sum\#}(l-1) > \text{capacity\_sum\_gain\_thre and } l < L \quad (6)$$

Wherein, capacity_sum#l represents the current cell capacity summation (that is, the weighted summation of the temp cell capacity) corresponding to the DU determined in a process of the l-th update. capacity_sum#(l−1) represents the cell capacity summation corresponding to the DU determined in a process of the (l−1)-th update (the weighted summation of the temp cell capacity determined with respect to the last time of the l-th update). capacity_sum_gain_thre represents a weighted summation gain threshold, that is, the set threshold described above, which is configurable, for example, may be configured to be 0. L is an upper limit of the above times of update, which is configurable, for example, it may be configured as 200, l is an integer greater than 2 and less than or equal to L.

In operation S720, the current cell capacity corresponding to each cell may be determined as the predicted cell capacity of the plurality of cells, that is, the current temp cell capacity temp_cell_capacity including the current cell capacity of each of the plurality of cells is determined as the predicted cell capacity predicted_cell_capacity.

In addition, if the above judgment (6) is valid, that is, if the difference between the current cell capacity summation corresponding to the DU and the cell capacity summation determined last time is less than or equal to the set threshold, and the number of updates of cell capacities does not reach the upper limit of the number of updates, the current cell capacity summation corresponding to the DU does not satisfy the set condition, and thus it proceeds to operation S730.

In operation S730, the current cell capacity corresponding to each cell is updated. The process of updating the current cell capacity corresponding to each cell is described in greater detail below with reference to FIG. 8.

Figure 8:
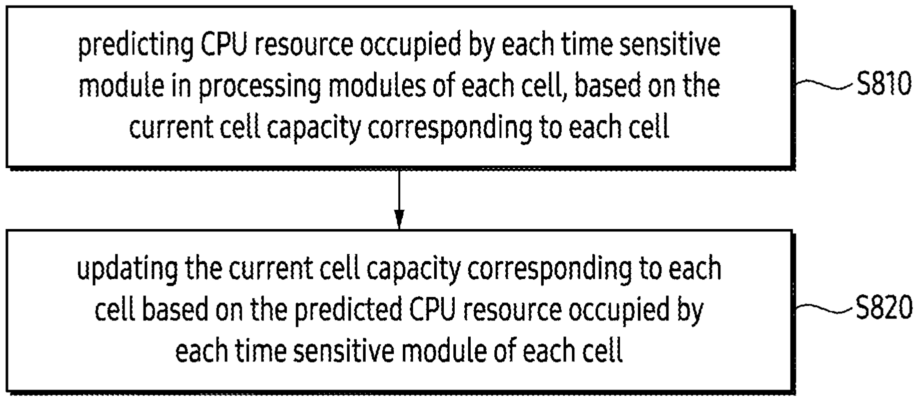
FIG. 8 is a flowchart illustrating an example process of updating the current cell capacity corresponding to each cell according to various embodiments.

For example, as shown in FIG. 8, in operation S810, CPU resource occupied by each time sensitive module (e.g., time critical module or non time critical module) in processing modules of each cell is predicted, based on the current cell capacity corresponding to each cell.

In an embodiment, the predicting the CPU resource occupied by each time sensitive module in the processing modules of each cell, based on the current cell capacity corresponding to each cell, includes: using a neural network model to predict the CPU resource occupied by each time sensitive module in the processing modules of each cell, based on the current cell capacity corresponding to each cell.

Figure 10A:
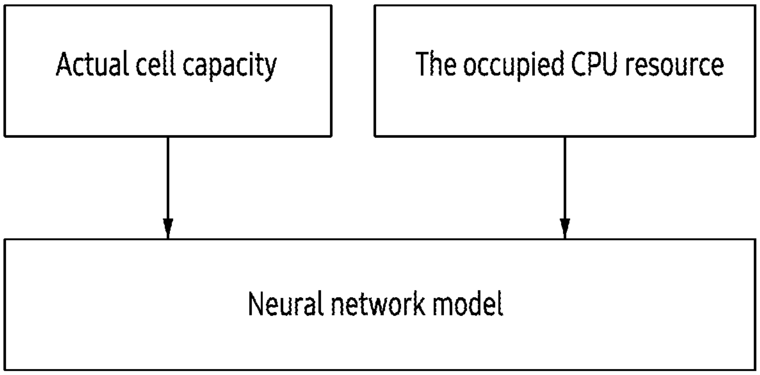
FIG. 10A is a diagram showing illustrating training of a neural network model according to various embodiments.

As shown in FIG. 10A, the neural network model is trained based on the actual cell capacity of each cell of the DU and the information on the occupied CPU resource corresponding to the actual cell capacity. After training, this neural network model has an ability to predict a case of the CPU resource occupied by each time sensitive module (e.g. time critical module or non time critical module) according to the cell capacity. In the disclosure, in the initial stage, the neural network model used for the above prediction process at the earliest may be a model obtained via a long time of training by the network node, and in the subsequent process, the network node may train the neural network model by applying the acquired actual cell capacity of each cell and the information on the occupied CPU resource corresponding to the actual cell capacity according to a predetermined training period. For example, the network node may acquire the actual cell capacity of each cell and the information on the occupied CPU resource corresponding to the actual cell capacity according to a preset period of 10 TTIs, and then train the neural network model by applying the actual cell capacity of each cell and the information on the occupied CPU resource corresponding to the actual cell capacity acquired successively for 20 times (e.g. 200/10=20 times), according to the preset training period of 200 TTIs, wherein the actual cell capacities of the plurality of cells corresponding to the DU acquired each time are formed into a one-dimensional array, and the information on the occupied CPU resource corresponding to the actual cell capacity of each cell acquired this time is also formed into a one-dimensional array, then they are input into the neural network model, wherein the occupied CPU resource used for training the neural network model need to be marked with the processing module constraints described above, so that the neural network model may know the CPU resource occupied by each time critical module, each non time critical module and each time insensitive module respectively. In addition, the network node may apply the trained neural network model to the above prediction process after each training of the neural network model, or apply the trained neural network model to the above prediction process after a plurality of training. In addition, although in the above description, the predetermined training period is different from the preset period for the network node to acquire the actual cell capacity of each cell and the information on the occupied CPU resource corresponding to the actual cell capacity, but the predetermined training period may also be the same as the preset period, that is, the network node may train the neural network model after acquiring the actual cell capacity of each cell and the information on the occupied CPU resource corresponding to the actual cell capacity each time. In addition, the neural network model may be a feedforward neural network model, but the disclosure does not specifically define the specific implementation of the neural network model.

Herein, an available CPU_res_calculator represents the trained neural network model, which may also be referred to a CPU resource calculator. Since the trained neural network model has the ability to predict the case of the CPU resource occupied by each time sensitive module (e.g. time critical module or non time critical module) according to the cell capacity, and the current cell capacity of each cell as described above may be generally represented as the temp cell capacity temp_cell_capacity, therefore CPU_res_calculator (temp_cell_capacity) represents the CPU resource occupied by the time sensitive modules of each cell predicted by the neural network model CPU_res_calculator based on the input temp cell capacity temp_cell_capacity. That is, the neural network model may be used to predict the CPU resource occupied by each time sensitive module in the software modules of each cell based on the current cell capacity corresponding to each cell.

Using the neural network model to predict the CPU resource occupied by time critical modules and non time critical modules in each cell may help determine a security boundary of cell capacity and ensure that the predicted cell capacity of the plurality of cells will not cause depletion of CPU resource and even affect real-time normal operations of a system, thus the predicted cell capacity may safely approach the total target cell capacity as much as possible (e.g., the total target cell capacity determined by the target cell capacity of each cell reported by the DU estimated with respect to this preset period) to used the limited CPU resource with maximum efficiency.

In operation S820, the current cell capacity corresponding to each cell is updated based on the predicted CPU resource occupied by each time sensitive module of each cell.

For example, the updating the current cell capacity corresponding to each cell based on the predicted CPU resource occupied by each time sensitive module of each cell, includes: updating the current cell capacity corresponding to each cell when the CPU resource occupied by each time sensitive module of each cell is not greater than a corresponding upper limit of resource occupation. This will be described in greater detail below with reference to FIG. 9.

Figure 9:
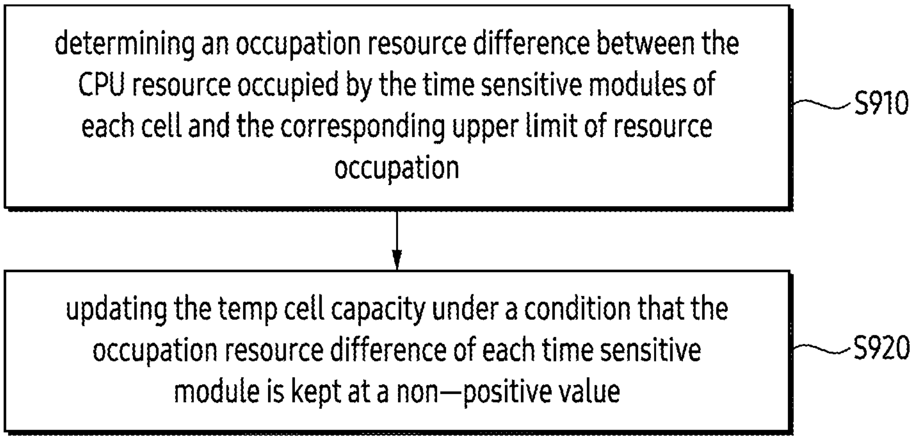
FIG. 9 is a flowchart illustrating an example process of updating current cell capacity of each cell according to various embodiments.

FIG. 9 is a flowchart illustrating an example process of updating current cell capacity of each cell according to various embodiments.

In operation S910, an occupation resource difference between the CPU resource occupied by the time sensitive modules (e.g. time critical modules and non time critical modules) of each cell and the corresponding upper limit of resource occupation is determined.

For example, the above occupation resource difference (or constraint function) is determined with respect to each time sensitive module according to the following equation (7):

$$\text{res\_diff}\#m = \text{CPU\_res}\#m - \text{upper\_limit}\#m \tag{7}$$

Wherein, upper_limit#m represents an upper limit of resource occupation of the m-th time sensitive module, wherein the network node may acquire the upper limit of resource occupation of each time sensitive module in the form shown in Table 2 above. CPU_res#m represents CPU resource occupied by the m-th time sensitive module, it is determined from the CPU resource occupied by the time sensitive modules of each cell predicted by the CPU_res_calculator (temp_cell_capacity) as described above. For example, the network node may determine the CPU resource occupied by the m-th time sensitive module from the CPU resource occupied by the time sensitive modules of each cell predicted by the CPU_res_calculator (temp_cell_capacity), according to the module ID and module type in the processing module constraints shown in Table 2 above. res_diff#m represents a resource deference between the CPU resource CPU_res#m occupied by the m-th time sensitive module and the upper limit of resource occupation of the m-th time sensitive module. Therefore, according to equation (7) above, the occupation resource difference of each time sensitive module may be determined. It assumes that, for a plurality of cells under the DU, there are M time sensitive modules in total (that is, there are M time critical modules and non time critical modules in total), then there are M occupation resource differences accordingly, thereby forming an occupation resource difference array res_diff with a length of M, wherein M is an integer greater than or equal to 2. In operation S920, the temp cell capacity is updated under a condition that the occupation resource difference of each time sensitive module is kept at a non-positive value, which may avoid depletion of CPU resource.

In an embodiment, a Sequential Quadratic Programming (SQP) optimization method may be applied to operation S920, and the SQP optimization method may complete an optimization task of a nonlinear system in the presence of a constraint condition.

Figure 10B:
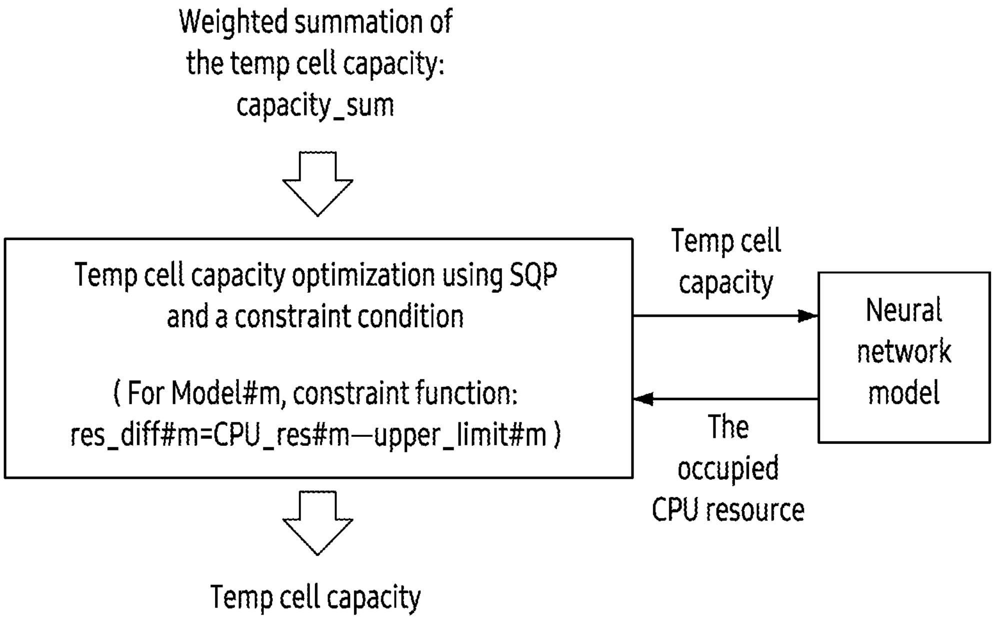
FIG. 10B is a diagram illustrating an example temp cell capacity optimization process according to various embodiments.

For example, using the SQP optimization method, as shown in FIG. 10B, the temp cell capacity temp_cell_capacity is adjusted continuously, and after adjusting the temp cell capacity temp_cell_capacity each time, based on this temp cell capacity temp_cell_capacity, the neural network model is used to predict the CPU resource occupied by each time sensitive module, and under the condition that the occupation resource difference of each time sensitive module is kept as a non-positive value (that is, under the constraint condition that each element in the occupation resource difference array res_diff is kept as a non-positive value), it maximizes the weighted summation of the temp cell capacity capacity_sum determined using the equation (5) above, at this time, the temp cell capacity, when the weighted summation of the temp cell capacity capacity_sum is maximized, is determined as the updated temp cell capacity, that is, the updated current cell capacity of each cell. Since the calculation of the weight array weight has considered adjustment requirements of the capacity parameters of each cell in the temp cell capacity, and in the process of maximizing the weighted summation of the temp cell capacity capacity_sum, a larger weight will result in a larger adjusted temp cell capacity temp_cell_capacity, therefore, the SQP optimization method may realize the optimization adjustment of the temp cell capacity temp_cell_capacity.

Referring back to FIG. 7, after updating the current cell capacity corresponding to each cell, in operation S740, the current cell capacity summation corresponding to the DU is determined based on the updated current cell capacity of each cell, for example, the process described above with reference to steps S610 and S620 of FIG. 6 is repeated, so it is not be repeated here. After determining the current cell capacity summation corresponding to the DU based on the updated current cell capacity of each cell, return to operation S710 for determination again.

By updating the current cell capacity corresponding to each cell while keeping the occupation resource difference of each time sensitive module at a non-positive value, it makes the constraint caused by the limited CPU resource being fully considered, thus, a final update result (that is, a result of the temp cell capacity temp_cell_capacity adjusted through the final update process, that is, the predicted cell capacity predicted_cell_capacity) may continuously approach the target cell capacity of all cells under a premise of security. More specifically, after each update of the current cell capacity of each cell (that is, the temp cell capacity temp_cell_capacity), the weight weight will be updated according to a difference diff between this updated temp cell capacity temp_cell_capacity and a total target cell capacity (that is, an ideal value expected by the system). For example, a update direction (increase or decrease) of the n-th weight weight#n reflects that the n-th cell capacity parameter in the temp cell capacity is expected to be increased or decreased, and an absolute value of the n-th updated weight weight#n reflects an extent by which the n-th cell capacity parameter is expected to be adjusted, that is, the updated n-th weight weight#n carries information on adjustment of the n-th cell capacity parameter, to update a next update process of the temp cell capacity, so that the temp cell capacity is constantly approaching the total target cell capacity (that is, the ideal value expected by the system).

In addition, when operation S710 of FIG. 7 is described above, whether the current cell capacity summation satisfies the set condition is determined based on equation (6). If so, the current cell capacity of each cell is determined as the predicted cell capacity of the plurality of cells through operation S720. If not, the current cell capacity corresponding to each cell is updated through operations S730 and S740, and the current cell capacity summation corresponding to the DU is determined based on the updated current cell capacity of each cell. However, the present disclosure is not limited to this. Instead of using the equation (6) for determination, the embodiments may use operations S730 and S740 to update the current cell capacity corresponding to each cell for many times and re-determine the current cell capacity summation corresponding to the DU based on the updated current cell capacity of each cell, thereby obtaining L groups of the temporary cell capacity, then select one group of temporary cell capacity with the largest cell capacity summation, from the L groups of cell capacity, as the predicted cell capacity of the plurality of cells. That is, it is determined whether a predetermined number of cell capacity summations have been determined; if so, the current cell capacity of each cell, corresponding to the cell capacity summation satisfying the set condition among the predetermined number of the cell capacity summations, is determined as the predicted cell capacity of the plurality of cells; otherwise, the current cell capacity corresponding to each cell is updated, and the current cell capacity summation corresponding to the DU is determined based on the updated current cell capacity of each cell.

It may be seen from the above description that, the cell capacity summation satisfying the set condition is actually the max cell capacity summation among the respective determined cell capacity summations.

Referring back to FIG. 3, based on performing operation S320, the predicted cell capacity of the plurality of cells may be determined. If the network node is a base station, the network node may allocate a cell capacity with respect to each of the plurality of cells according to the predicted cell capacity. If the network node is a network device (for example, a RIC in an O-RAN) other than the base station, the network node may transmit the determined predicted cell capacity predicted_cell_capacity to the base station, for the base station allocating the cell capacity with respect to each of the plurality of cells according to the predicted cell capacity predicted_cell_capacity. The process of allocating the cell capacity with respect to each of the plurality of cells will be described in greater detail below.

As mentioned above, the processing modules (e.g. software modules) installed on the DU for each cell are classified into time sensitive modules (e.g. time critical modules and non time critical modules) and time insensitive modules, wherein there is no fixed time sequence requirement for the scheduling execution of time insensitive modules. Therefore, idle CPU resource may be freely used to complete processing, so as to further improve the usage rate efficiency of CPU resource. Therefore, the network node may determine the idle CPU resource of the DU based on the determined predicted cell capacity, for the base station allocating the determined idle CPU resource with respect to time insensitive modules, to help the DU achieve more efficient CPU resource scheduling.

Therefore, the method described in FIG. 3 performed by the network node may further include: determining idle CPU resource of the DU based on the predicted cell capacity of the plurality of cells, for the base station allocating CPU resource with respect to time insensitive modules of the plurality of cells according to the idle CPU resource.

For example, the determining the idle CPU resource of the DU based on the predicted cell capacity of the plurality of cells includes: using a neural network model to determine CPU resource occupied by time sensitive modules in the processing modules of each cell, based on the predicted cell capacity of the plurality of cells.

In an embodiment, similar to using the neural network model CPU_res_calculator to predict the CPU resource occupied by the time sensitive modules of each cell based on the temp cell capacity temp_cell_capacity described above in the operation S810, as shown in FIG. 10C. the predicted cell capacity may be input into the neural network model (e.g. CPU resource calculator), to predicts the CPU resource occupied by the time sensitive modules of each cell by CPU_res_calculator(predicted_cell_capacity), wherein the CPU resource occupied by the m-th time sensitive module (e.g., time critical module or non time critical module) among the M time sensitive modules of all cells under the DU may be represented as used_resource_module#m, as shown in FIG. 10C, the predicted time sensitive modules (such as Module#0, Module#1 and Module#2) occupy partial CPU resource.

In addition, the determining the idle CPU resource of the DU based on the predicted cell capacity of the plurality of cells further includes: determining the idle CPU resource of the DU based on the CPU resource occupied by the time sensitive modules and start time of running of the time sensitive modules.

For example, first, end time of the running of the time sensitive modules is determined, based on the CPU resource occupied by the time sensitive modules and the start time of the time sensitive modules. That is, for the m-th time sensitive module among the M time sensitive module of all cells under the DU, the network node may use the following equation (8) to determine the end time of the m-th time sensitive module based on the CPU resource used_resource_module#m occupied by the m-th time sensitive module and the start time start_time_module#m of the m-th time sensitive module involved in the acquired cell capacity related information:

$$\text{end\_time\_module}\#m = \text{start\_time\_module}\#m + \text{used\_resource\_module}\#m \quad (8)$$

Figure 10C:
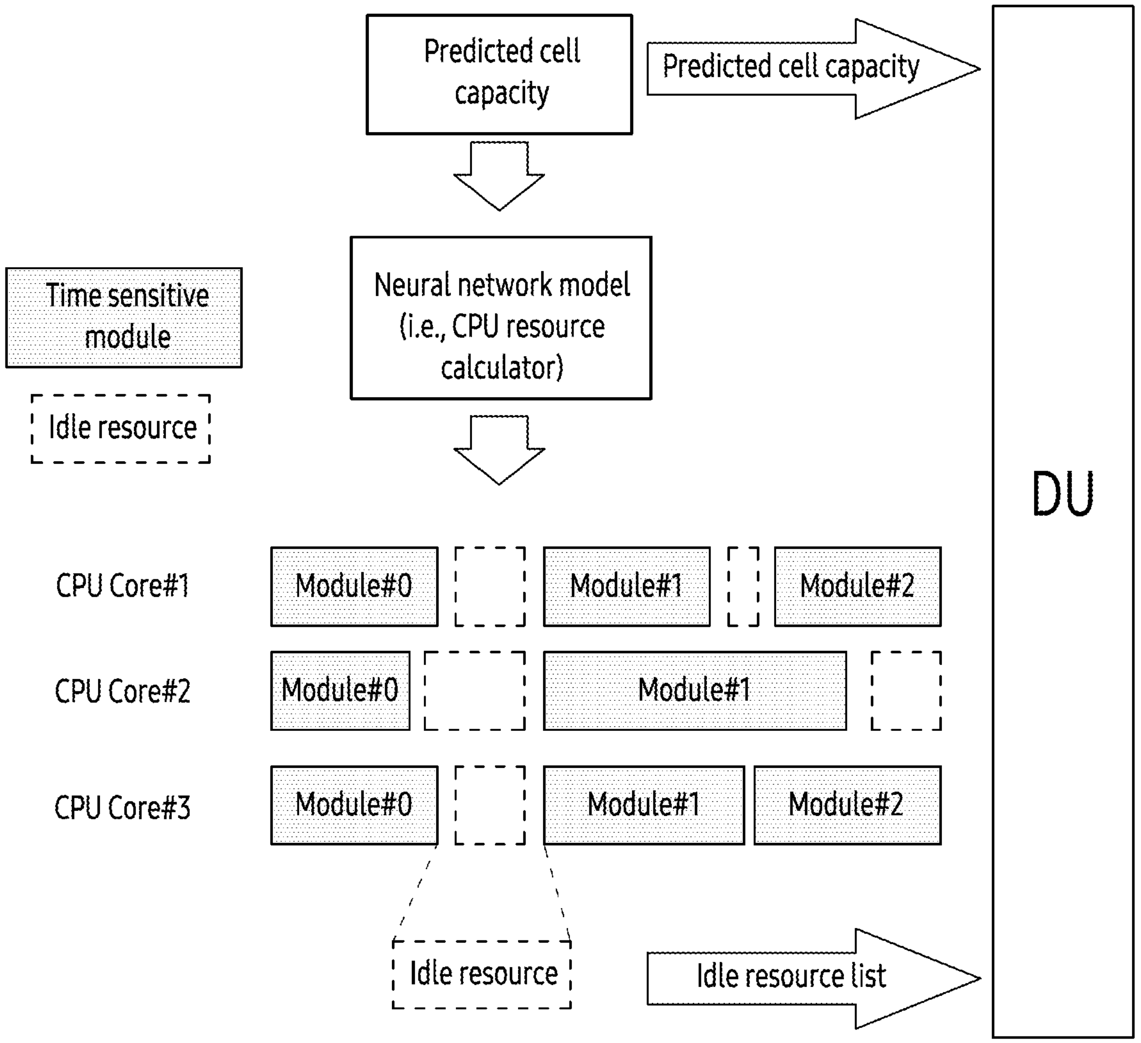
FIG. 10C is a diagram illustrating an example process of determining idle CPU resource according to various embodiments.

The idle CPU resource is determined, based on the start time and end time of running of the time sensitive modules adjacent in time sequence. For example, for the two consecutive time sensitive modules module#t and module#(t+1) adjacent in time sequence, the start time idle_start#i and the end time idle_end#i of the idle CPU resource may be determined, wherein idle_start#i=end_time_module#t, idle_end#i=start_time_module#(t+1), wherein end_time_module#t represents the end time of the t-th module module#t, start_time_module#(t+1) represents the start time of the (t+1)-th module module#(t+1). As shown in FIG. 10C, CPU resource between CPU resource occupied by the time sensitive modules (e.g. time critical modules and/or non time critical modules) are idle CPU resource.

The determined idle CPU resource (such as {idle_start#i, idle_end#i}) may be aggregated to form a list of idle resource, that is, information on the determined idle CPU resource, for the base station completing the scheduling execution of time insensitive modules according to the information on the determined idle CPU resource, thereby achieving more efficient CPU resource scheduling.

The process of determining the predicted cell capacity of the plurality of cells by the network node and the process of determining the idle CPU resource (these two processes may be collectively referred to as an AI-based cell capacity decision process) are described in detail above with reference to FIGS. 3 to 10C, the AI-based cell capacity decision process is generally described with reference to FIGS. 10D and 10E below.

Figure 10D:
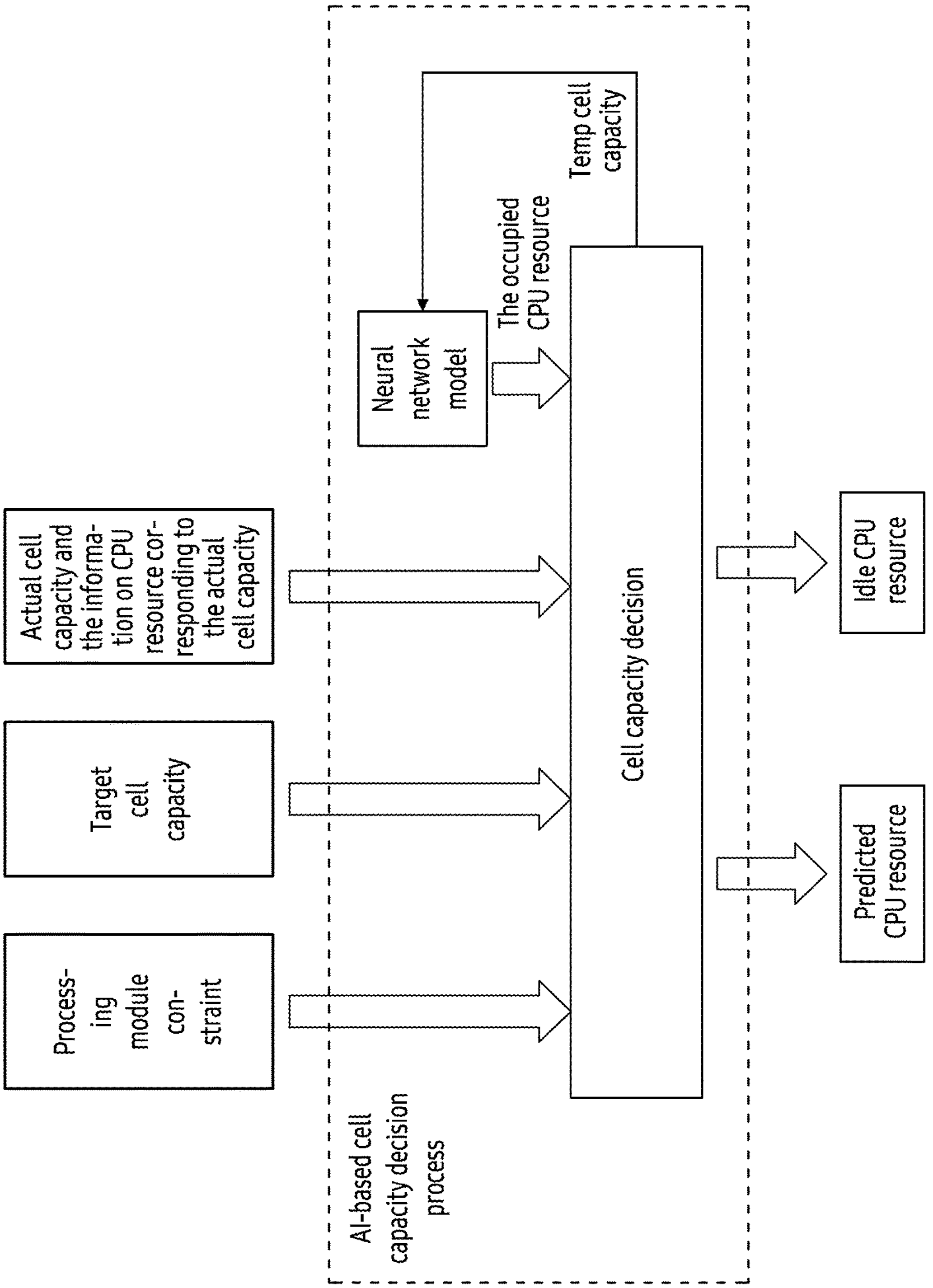
FIG. 10D is a diagram illustrating an example process of an AI-based cell capacity decision determining a predicted cell capacity and idle CPU resource of a plurality of cells according to various embodiments.

FIG. 10D is a diagram illustrating an example process of an AI-based cell capacity decision determining predicted cell capacity and idle CPU resource of a plurality of cells according to various embodiments. FIG. 10E is a diagram illustrating an example process of an AI-based cell capacity decision determining predicted cell capacity of a plurality of cells according to various embodiments.

Figure 10E:
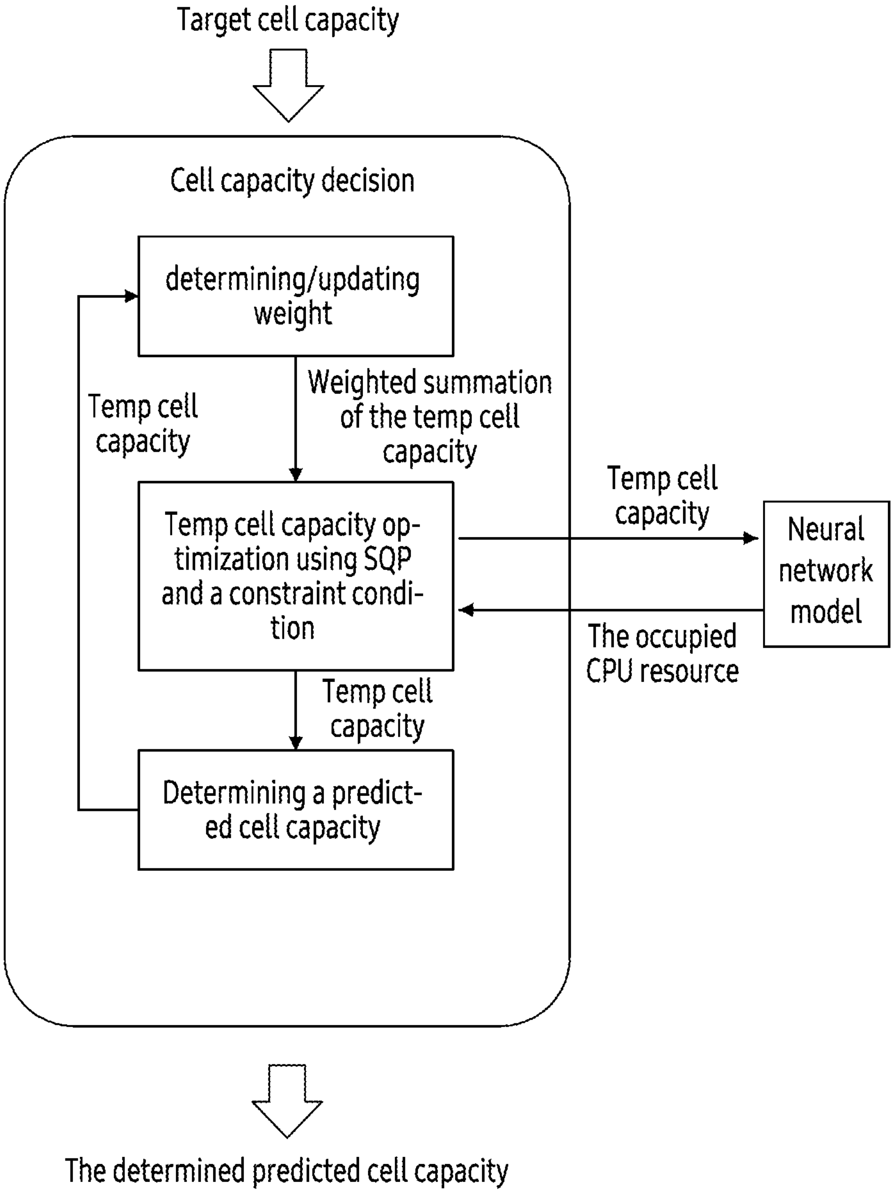
FIG. 10E is a diagram illustrating an example process of an AI-based cell capacity decision determining a predicted cell capacity of a plurality of cells according to various embodiments.

As shown in FIGS. 10D and 10E, the AI-based cell capacity decision process includes two parts, e.g., a neural network model and a cell capacity decision process. The input of the AI-based cell capacity decision process are: processing module constraints of cells, actual cell capacities of cells, the information on the occupied CPU resource corresponding to the actual cell capacities, and target cell capacities of the cells. The AI-based cell capacity decision process is as follows:

Step (1): The AI-based cell capacity decision process may periodically train the neural network model based on the input processing module constraints of the cell, the actual cell capacities of the cells, and the information on the occupied CPU resource corresponding to the actual cell capacities (not shown in FIG. 10D).

Step (2): The AI-based cell capacity decision process uses the target cell capacities of the cells to set a temp cell capacity with respect to the plurality of cells;

Step (3): The weights are determined with respect to each cell capacity parameter in the temp cell capacity according to the target cell capacities and the temp cell capacity (for example, which is calculated according to the equation (2), (3) and (4) above);

Step (4): The trained neural network model is used to predict the CPU resource occupied by each time sensitive module based on the temp cell capacity, the occupation resource difference between each time sensitive module and a corresponding upper limit is determined according to the predicted CPU resource occupied by each time sensitive module (for example, which are calculated according to the equation (7) above), and the cell capacity parameters in the temp cell capacity are adjusted to make the cell capacity summation (for example, which is calculated according to the equation (5) above) maximum in a case of keeping the occupied resource difference of each time sensitive module as a non-positive value;

Step (5): If the determined cell capacity summation does not satisfy the set condition (for example, the judgment (6) is valid), it returns to step (3) and repeats step (3) according to the temp cell capacity at this time, to update the weight of each cell capacity parameter in the temp cell capacity, and executes the subsequent steps in sequence; if the determined cell capacity summation satisfies the set condition (for example, the judgment (6) is not valid), the temp cell capacity at this time is determined as the predicted cell capacity of the plurality of cells;

Step (6): The CPU resource occupied by each time sensitive module is predicted based on the neural network model, according to the determined predicted cell capacity, and the idle CPU resource is determined based on the predicted CPU resource occupied by each time sensitive module and the start time of each time sensitive module.

Through the above processes, the AI-based cell capacity decision process may output the predicted cell capacity and idle CPU resource of the plurality of cells.

The processing of determining the predicted cell capacity and idle CPU resource of the plurality of cells is described with reference to FIGS. 3 to 10E above. The method performed by the base station will be described in greater below with reference to the drawings.

Figure 11:
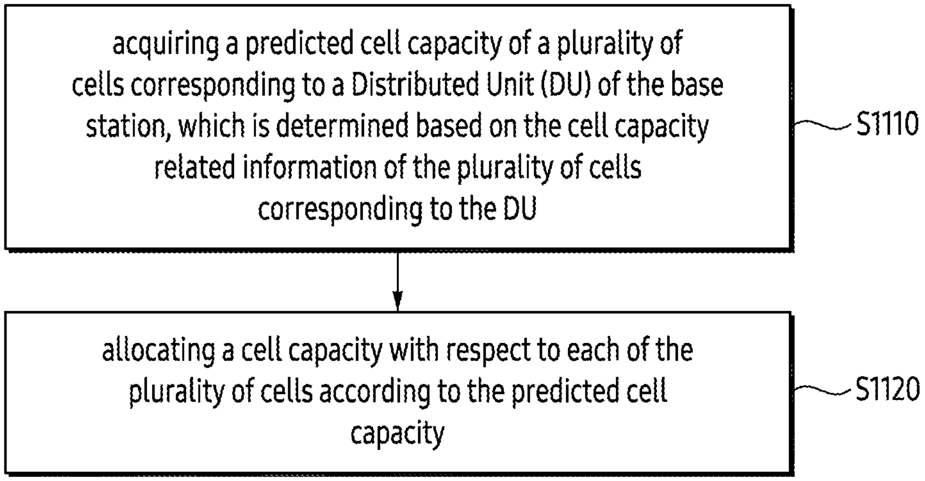
FIG. 11 is a flowchart illustrating an example method performed by a base station according to various embodiments.

FIG. 11 is a flowchart illustrating an example method performed by a base station according to various embodiments.

As shown in FIG. 11, in operation S1110, a predicted cell capacity of a plurality of cells corresponding to a Distributed Unit (DU) of the base station, which is determined based on the cell capacity related information of the plurality of cells corresponding to the DU, is acquired.

As described above with reference to FIG. 3, the predicted cell capacity of the plurality of cells is a parameter set including parameter sets {RRC-UE,SRS-UE,SUS-UE,MU-Layer} of the cell capacity of each of the plurality of cells. For example, if there are C cells, and the cell capacity of each cell including F cell capacity parameters, the predicted cell capacity of the C cells is one parameter set with F×C capacity parameters.

In addition, the predicted cell capacity acquired in operation S1110 may be a predicted cell capacity determined when the base station as a network node performs the method described above with reference to FIG. 3. The predicted cell capacity acquired in operation S1110 may also be acquired by the base station from a network node that performs the method described above with reference to FIG. 3. Since the process of determining the predicted cell capacity of the plurality of cells corresponding to DU based on cell capacity related information has been described above with reference to FIG. 3, it will not be repeated here.

In operation S1120, a cell capacity is allocated with respect to each of the plurality of cells according to the predicted cell capacity.

The allocating the cell capacity with respect to each of the plurality of cells according to the predicted cell capacity includes: determining a priority of each cell of the DU. This will be described in greater detail below with reference to FIG. 12.

Figure 12:
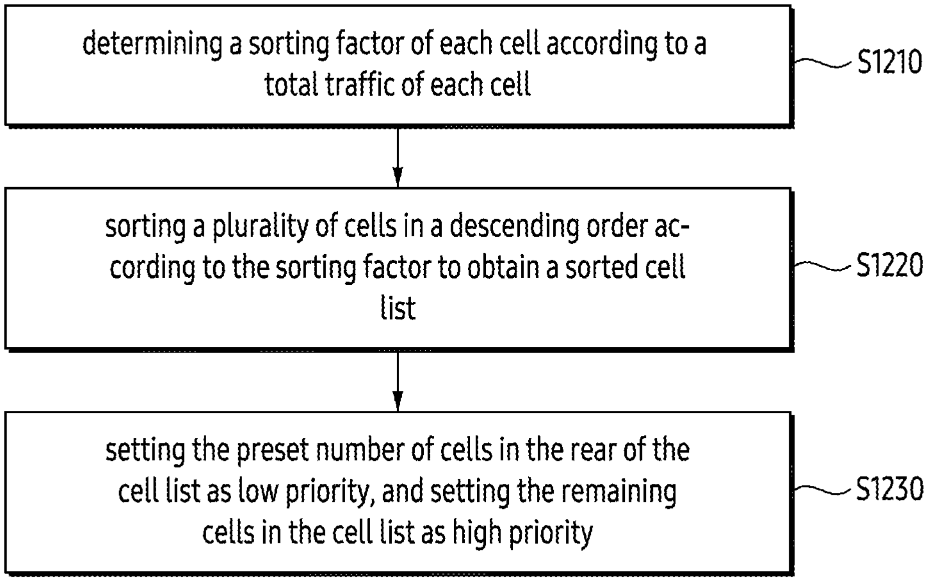
FIG. 12 is a flowchart illustrating an example process of determining a priority of each cell of a DU according to various embodiments.

FIG. 12 is a flowchart illustrating an example process of determining a priority of each cell of a DU according to various embodiments.

As shown in FIG. 12, in operation S1210, a sorting factor of each cell is determined according to a total traffic of each cell. For example, the sorting factor of each cell may be determined according to the following equation (9):

$$\text{counter}\#c = \text{bo\_size}\#c \tag{9}$$

Wherein, counter#c represents a sorting factor of the c-th cell, and bo_size#c represents a total traffic of the c-th cell.

In operation S1220, a plurality of cells are sorted in a descending order according to the sorting factor to obtain a sorted cell list, that is, the plurality of cells under the DU are sorted in the descending order according to the sorting factors counter, to form the sorted cell list sorted_cell_list.

In operation S1230, the preset number of cells in the rear of the cell list are set as low priority, and the remaining cells in the cell list are set as high priority. Wherein, the preset number is configurable. So far, the priority of each cell of the DU may be determined. However, the disclosure may dynamically sort the cells by changing the sorting factor counter#c, thereby dynamically changing the priorities of the cells and enable the cells to apply more reasonable cell capacities.

For example, after a configurable preset update period, or when an emergency occurs, or according to user requirements, the sorting factors of cells with low priority may be changed according to a preset rule. For example, after a configurable preset update period, or when an emergency occurs, or according to user requirements, the sorting factors of all cells with low priority may be increased by 1, that is, the sorting factors of all cells with low priority may be updated. Then operation S1220 is performed again, since the re-determined sorting factor of each cell is different from the previous sorting factor, the sorted cell list obtained by descending sorting a plurality of cells according to the sorting factors in operation S1230 may change, which will cause the priorities of the cells to change, thereby achieving the purpose of dynamically adjusting the priorities of the cells. For example, the priority determination operation is performed again through operations S1220 to S1230. In addition, a method for dynamically sorting cells is described above, but the disclosure is not limited to this, the operation of sorting the cells may be performed in different standards according to different requirements of operators, to determine cells with high priority requirements. For example, if an important meeting or event will be held within coverage of the plurality of cells, the operator may arrange the plurality of cells in front of the cell list according to a certain rule (e.g. which have high priorities) and arrange other cells in the rear of the cell list (e.g. which have low priorities), or the operator may arrange the cells with VIP users in the front of the cell list (e.g. which have high priorities) and arrange other cells with ordinary users in the rear of the cell list (e.g. which have low priorities), the above is only an example, any method that may sort the plurality of cells under the DU and assign priorities to them may be applied to the disclosure.

The allocating the cell capacity with respect to each of the plurality of cells according to the predicted cell capacity further includes: allocating a cell capacity with respect to each cell, using the predicted cell capacity, according to the priority of each cell.

For example, the allocating the cell capacity with respect to each cell, using the predicted cell capacity, according to the priority of each cell, includes: according to the priority of each cell, performing, with respect to each cell successively, steps including: if a priority of a current cell is high priority, or if the priority of the current cell is low priority and the remaining CPU resource is not less than a preset threshold, allocating a cell capacity for the current cell based on the predicted cell capacity, and updating the remaining CPU resource; if the priority of the current cell is low priority and the remaining CPU resource is less than the preset threshold, determining an updated cell capacity of the current cell (e.g., a protection cell capacity to be applied to the current cell) based on the remaining CPU resource, allocating the cell capacity for the current cell based on the updated cell capacity (e.g., the protection cell capacity), and updating the remaining CPU resource. This will be described in greater detail below with reference to FIG. 13.

Figure 13:
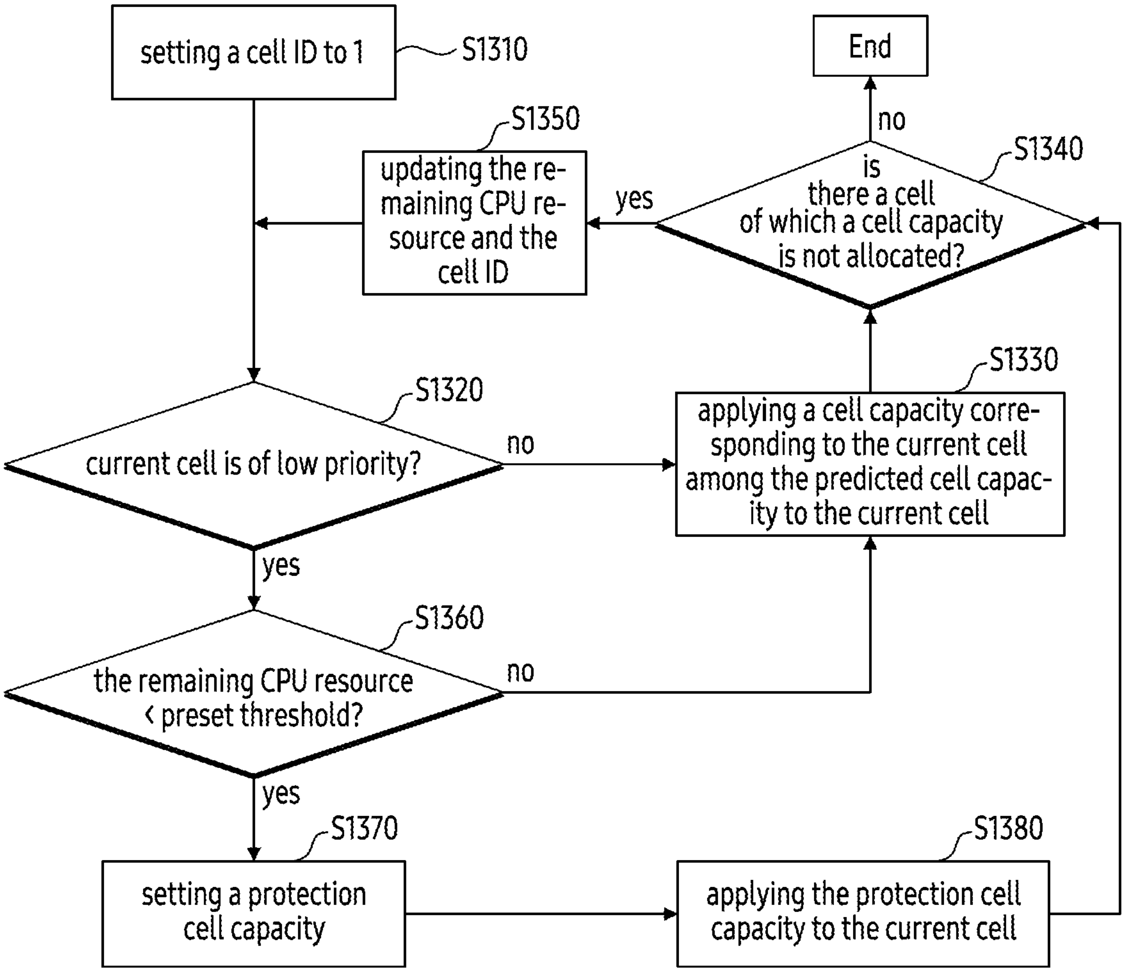
FIG. 13 is a flowchart illustrating an example process of allocating a cell capacity for each cell according to various embodiments.

FIG. 13 is a flowchart illustrating an example process of allocating a cell capacity for each cell according to various embodiments.

As shown in FIG. 13, in operation 51310, a cell ID is set to 0, that is, the subsequent operation starts from the first cell in the sorted cell list.

In operation S1320, whether a current cell is of low priority is determined. If a priority of the current cell is not low priority (that is, the priority of the current cell is high priority), it proceeds to operation S1330, a cell capacity corresponding to the current cell among the predicted cell capacity is applied to the current cell, and proceeds to operation S1340, whether there is any cell in the cell list of which a cell capacity is not allocated. If the cell list is empty, it ends. Otherwise, it proceeds to operation S1350, the remaining CPU resource is updated, and the cell ID is updated, that is, the cell ID is increased by 1, and it returns to operation S1320 to allocate a cell capacity for a next cell in the cell list.

If it is determined that the current cell is of low priority in operation S1320, it proceeds to operation S1360, whether the remaining CPU resource is less than a preset threshold, which is configurable, is determined. If the remaining CPU resource is not less than the preset threshold, it proceeds to operation S1330, that is, the cell capacity corresponding to the current cell among the predicted cell capacity is applied to the current cell.

If it is determined that the remaining CPU resource is less than the preset threshold in operation S1360, it proceeds to operation S1370, an updated cell capacity of the current cell (e.g., a protection cell capacity to be applied to the current cell) is determined according to the remaining CPU resource, and the determined updated cell capacity (e.g., the determined protection cell capacity) is allocated for the current cell in operation S1380, and it proceeds to operation S1340. Wherein, the updated cell capacity (e.g., the protection cell capacity) is less than the cell capacity corresponding to the current cell among the predicted cell capacity. For example, if the current cell is of low priority and the remaining CPU resource is less than the preset threshold, only partial software modules (mainly related to the SUS-UE parameter and MU_Layer parameter) of the current cell installed on the DU will be stopped, but the stop of the partial software modules will not affect basic cell functions, For example, in the cell capacity corresponding to the current cell among the predicted cell capacity, MU_Layer is 8, and when the third MU_Layer is scheduled, the remaining CPU resource will be less than the preset threshold, 34 herefore, the remaining 5 MU_Layers are skipped to avoid depletion of CPU resource, and MU_Layer is reset as 3 when the update cell capacity (e.g., the protection cell capacity) is determined. Therefore, the updated cell capacity is less than the cell capacity corresponding to the current cell among the predicted cell capacity. In other words, a value of the cell capacity parameter in the updated cell capacity (such as, the values of SUS-UE and MU_Layer) is less than the value of the corresponding cell capacity parameter in the cell capacity corresponding to the current cell among the predicted cell capacity.

In addition, the sorted cell list used in the process of applying cell capacity to each cell described above with reference to FIG. 13 may be updated according to the update process described above with reference to FIG. 12, or may not be updated.

By referring to the detailed process of operation S1120 described in FIGS. 12 and 13, a usage case of CPU resource may be monitored in real time, if it founds that a risk of depletion of CPU resource exists, the protection cell capacity is applied to a cell with low priority, to avoid depletion of CPU resource and eliminate a potential cell crash risk.

In addition, the method performed by the base station may further include: acquiring idle CPU resource of the DU, which are determined based on the predicted cell capacity; and allocating the idle CPU resource of the DU with respect to time insensitive modules in the processing modules of each cell, according to the idle CPU resource of the DU.

For example, the acquired idle CPU resource may be the idle CPU resource determined when the base station as a network node performs the method described above with reference to FIG. 3. The acquired idle CPU resource may also be acquired by the base station from the network node that performs the method described above with reference to FIG. 3. Since the process of determining the idle CPU resource of the DU based on the predicted cell capacity has been described above with reference to FIG. 3, it will not be repeated here.

In an embodiment, the allocating the idle CPU resource of the DU with respect to the time insensitive modules in the processing modules (e.g., software modules) of each cell, according to the idle CPU resource of the DU, includes: splitting time insensitive modules in the processing modules of each cell to obtain a plurality of time insensitive submodules for the plurality of cells; allocating the idle CPU resource of the DU with respect to each of the plurality of time insensitive sub-modules, according to the idle CPU resource of the DU. The process of allocating the idle CPU resource for each time insensitive submodule is described in greater detail below with reference to FIGS. 14A and 14B.

Figure 14A:
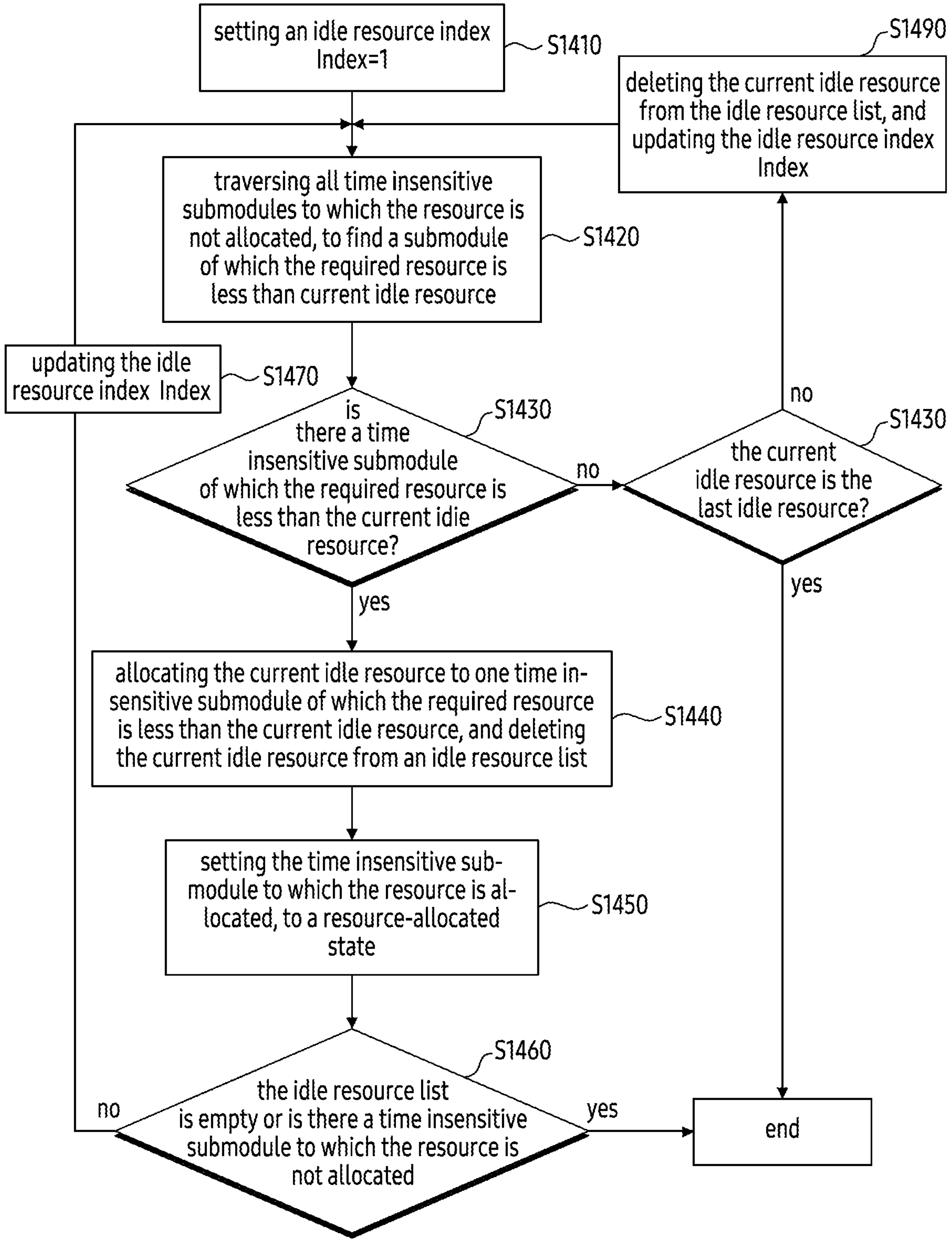
FIG. 14A is a flowchart illustrating an example process of allocating idle CPU resource for each time insensitive submodule according to various embodiments.
Figure 14B:
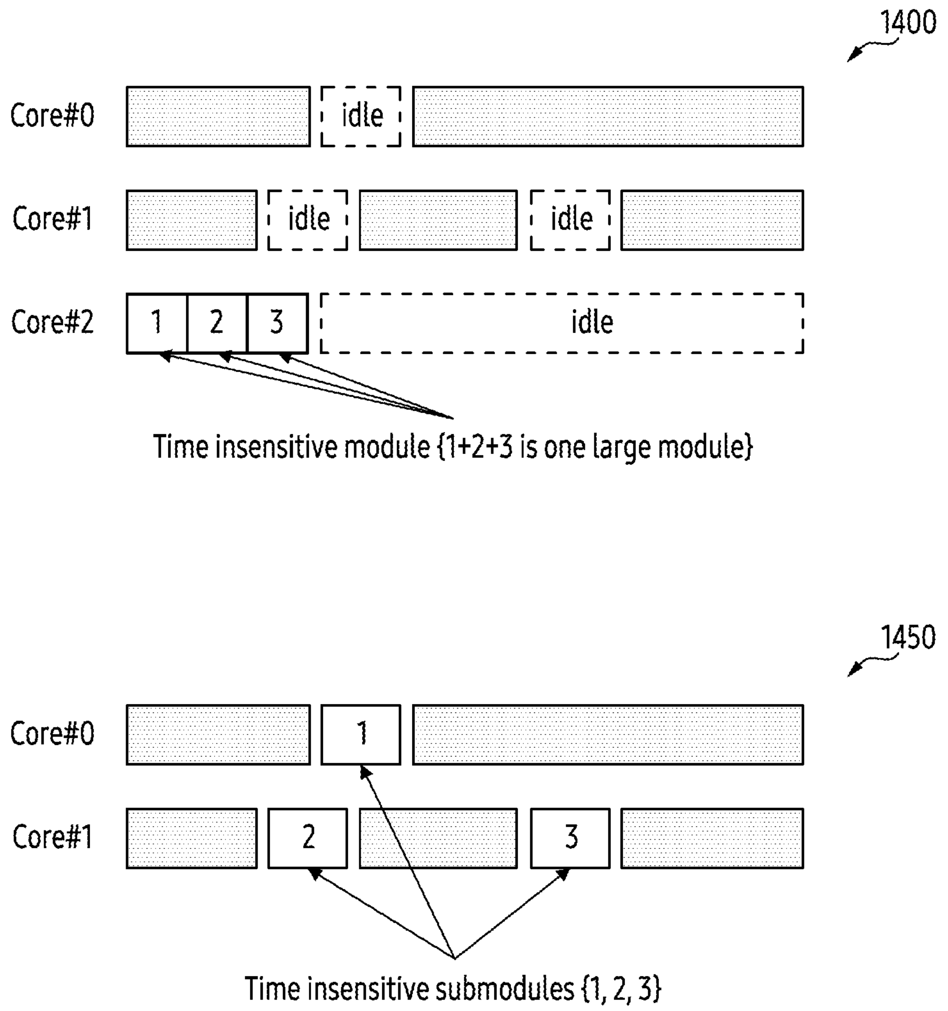
FIG. 14B is a diagram illustrating a result of the comparison between the existing technology and the disclosed method according to various embodiments.

FIG. 14A is a flowchart illustrating an example process of allocating idle CPU resource for each time insensitive submodule according to various embodiments.

As shown in FIG. 14A, in operation S1410, an idle resource index Index=1 is set, that is, allocation starts from the first idle resource in the idle resource list.

In operation S1420, all time insensitive submodules to which the resource is not allocated, among the plurality of time insensitive submodules are traversed, to find whose required resource is less than current idle resource with the index Index.

In operation S1430, it is determined whether there is a time insensitive submodule, of which the required resource is less than the current idle resource, among all the time insensitive submodules to which the resource is not allocated. If so, it proceeds to operation S1440, the current idle resource is allocated to one time insensitive submodule of which the required resource is less than the current idle resource, and the current idle resource is deleted from an idle resource list, and then it proceeds to operation S1450.

In operation S1450, the time insensitive submodule to which the resource is allocated in operation S1440 is set to a resource-allocated state, and then it proceeds to operation S1460.

In operation S1460, whether the idle resource list is empty or whether there is no time insensitive submodule to which the resource is not allocated.

If it is determined that the idle resource list is empty or there is no time insensitive submodule to which the resource is not allocated in operation S1460, then it ends; otherwise, it proceeds to operation S1470, the idle resource index Index is updated, for example, the index is increased by 1, that is, it starts an allocation of a next idle resource in the idle resource list, and it returns to operation S1420.

If it is determined that there is no time insensitive submodule, of which the required resource is less than the current idle resource, among all the time insensitive submodules to which the resource is not allocated in operation S1430, it proceeds to operation S1480 whether the current idle resource is the last idle resource in the idle resource list is determined.

If it is determined that the current idle resource is the last idle resource in the idle resource list in operation S1480, it ends. Otherwise, it proceeds to operation S1490, the current idle resource is deleted from the idle resource list, and the idle resource index Index is updated, for example, the index is increased by 1, that is, it starts an allocation of a next idle resource in the idle resource list.

Through the above allocation of idle resource, it makes each time insensitive submodule be allocated to the idle resource possibly, thereby improving the usage rate of a fragmented CPU resource. As shown in example 1400 of FIG. 14B, in the related art, the time insensitive module 1+2+3 is one large processing module, which separately occupies a part of the resource of Core#2. However, there are idle CPU resource in the resource of Core#0 and in the resource of Core#1, this idle CPU resource is not fully utilized, resulting in a waste of CPU resource and a relatively low CPU resource usage rate. However, as shown in example 1450 of FIG. 14B, using the above method of the present disclosure, the time insensitive modules may be split into time insensitive submodules 1, 2 and 3, and the idle resource in the resource of Core#0 and in the resource of Core#1 may be allocated to these time insensitive submodules 1, 2 and 3, so that Core#2 is not occupied by the time insensitive module, and the fragmented CPU resource usage rate is improved.

Figure 15A:
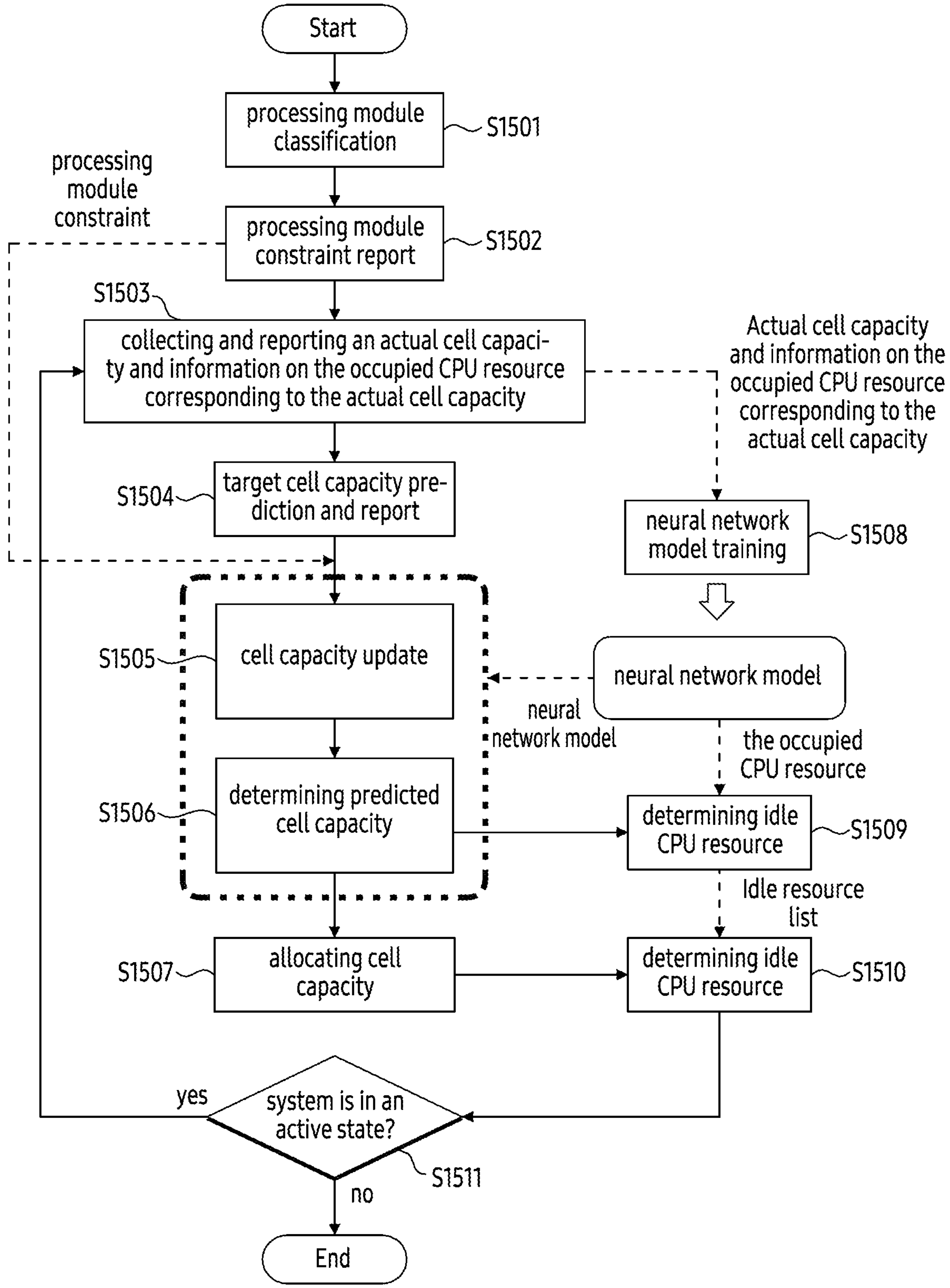
FIG. 15A is a flowchart illustrating an example AI-based cell capacity decision determining and applying of a predicted cell capacity of a plurality of cells and idle CPU resource in according to various embodiments.

FIG. 15A is a general flowchart illustrating an example AI-based cell capacity decision determining and applying of predicted cell capacity of a plurality of cells and idle CPU resource in according to various embodiments. In FIG. 15A, the dotted arrow represents the data flow and the solid arrow represents the processing flow.

As shown in FIG. 15A, in operation S1501, a base station classifies processing modules (e.g. software modules) of a plurality of cells sharing one CPU resource pool, e.g., classifies the processing modules into time critical modules, non time critical modules, and time insensitive modules, wherein the time critical modules and non time critical modules may be referred to as time sensitive modules. Since this has been described in detail with reference to FIG. 3, therefore, it may not be repeated here.

In operation S1502, the base station reports a processing module constraint of each processing module to the network node. For example, the processing module constraint may be reported in the format shown in Table 2 above.

In operation S1503, the base station collects an actual cell capacity and information on the occupied CPU resource corresponding to the actual cell capacity. For example, it may report this information to the network node in the way shown above with reference to FIG. 4.

In operation S1508, a network node trains a neural network model according to the acquired actual cell capacity and the information on the occupied CPU resource corresponding to the actual cell capacity, and also needs to use the processing module constraint during the training. This has been described with reference to FIG. 3, and will not be repeated here. The trained neural network model will predict the CPU resource occupied by each time sensitive module according to the temp cell capacity described above, and in operations S1505 and S1506, use the predicted CPU resource occupied by each time sensitive module to determine the predicted cell capacity.

In operation S1504, the base station predicts a target cell capacity of each cell and reports the target cell capacity of each cell to the network node. For example, the target cell capacity may be determined according to historical information and the current actual cell capacity. For example, the target cell capacity of each cell may be determined according to equation (1) above.

In operation S1505 and operation S1506, the predicted cell capacity of the plurality of cells is finally determined by iteratively performing cell capacity update and determining whether the updated cell capacity may be used as the predicted cell capacity, and the network node transmits the determined predicted cell capacity to the base station. Since this has been described in detail with reference to FIG. 5, it will not be repeated here.

In operation S1507, the base station allocates a cell capacity for each cell according to the acquired predicted cell capacity.

In operation S1509, the network node uses the neural network model to determine the CPU resource occupied by each time sensitive module according to the predicted cell capacity, and then determines the idle CPU resource in combination with the start time of each time sensitive module in the acquired processing module constraint, to forms a idle resource list, and sends the idle resource list to the base station.

In operation S1510, the base station divides the time insensitive modules of each cell into a plurality of time insensitive submodules, and allocates the idle CPU resource for the plurality of time insensitive submodules using the acquired idle resource list.

In operation S1511, the base station determines whether the system is in an active state. If so, it returns to operation S1503, the actual cell capacity and the information on the occupied CPU resource corresponding to the actual cell capacity are collected and reported according to a preset period, and then the subsequent processing is performed.

Since the above operations S1501 to S1510 have been described in detail with reference to FIGS. 3 to 14B, the details may not be repeated here.

In addition, in the above description, although operations S1501, S1502, S1503, S1504, S1507, S1510 and S1511 are performed by the base station, and operations S1505, S1506, S1508 and S1509 are performed by the network node, according to the previous description, the operations performed by the network node may be performed by the base station, or a part of the operations performed by the base station may be performed by the network node.

Figure 15B:
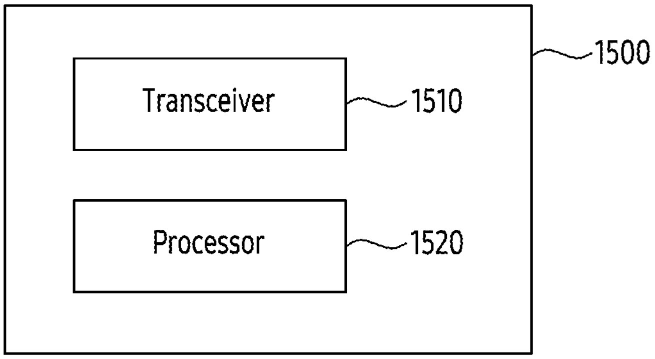
FIG. 15B is a block diagram illustrating an example configuration of a network node according to various embodiments.

FIG. 15B is a block diagram illustrating an example configuration of a network node 1500 according to various embodiments.

As shown in FIG. 15B, the network node 1500 includes a transceiver 1510 and a processor (e.g., including processing circuitry) 1520, wherein the processor 1520 is coupled to the transceiver 1510 and is configured to perform the method performed by the network node with reference to FIGS. 3 to 10E described above. For details of the operations of the above method performed by the network node, it may be referred to the descriptions in FIGS. 3 to 10E, and may not be repeated here.

Figure 16:
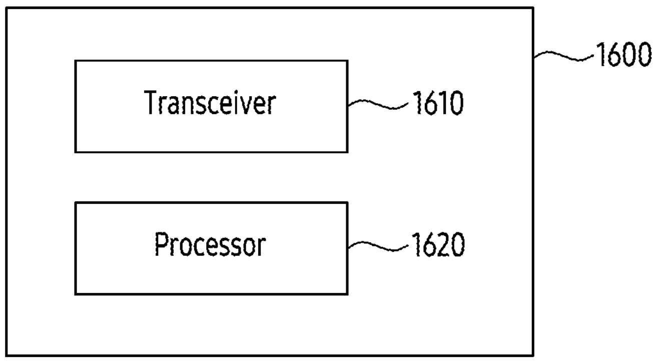
FIG. 16 is a block diagram illustrating an example configuration of a base station according to various embodiments.

FIG. 16 is a block diagram illustrating an example configuration of a base station 1600 according to various embodiments.

As shown in FIG. 16, the base station 1600 includes a transceiver 1610 and a processor (e.g., including processing circuitry) 1620, wherein the processor 1620 is coupled to the transceiver 1610 and is configured to perform the method performed by the base station described above with reference to FIGS. 11 to 14B. For details of the operation of the above method performed by the base station, please refer to the descriptions of FIGS. 11 to 14B, which may not be repeated here.

The method according to various example embodiments enables the network node to intelligently adjust a capacity of a plurality of cells in the same CPU resource pool according to the cell capacity requirement and CPU resource utilization, to achieve a dynamic balance of the CPU resource and the cell capacity so as to obtain an effect of maximizing the CPU resource usage rate thereby reducing the hardware cost of a single cell, and obtain an effect of meeting the requirements of dynamically changing cell capacity thereby improving user access success rate and cell throughput.

The method performed by the network node and the corresponding network node and the method performed by the base station and the corresponding base station according to various example embodiments are described above, respectively. The effects of applying the method according to various embodiments and the effects of applying the related art are compared in three different scenarios.

Figure 17A:
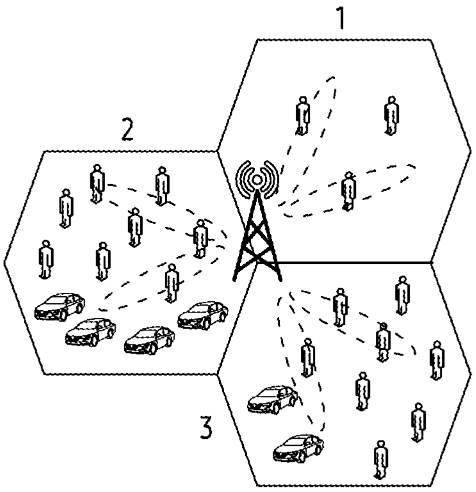
FIGS. 17A and 17B are diagrams illustrating an example scenario for comparing the existing method with the method of the present disclosure according to various embodiments.
Figure 17B:
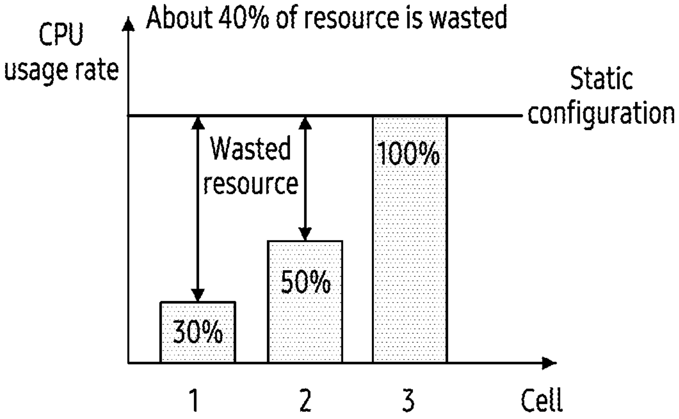

Scenario 1: A static cell capacity configuration is adopted. Regardless of real-time cell requirements, a capacity configuration of each cell remain unchanged, and considering that the total CPU resource is fixed, in order to ensure that each cell may meet the requirement at most time, more CPU resource will be reserved, resulting in a limited number of cells that the last CPU may support, and an increase in the cost of a single cell. As shown in FIGS. 17A and 17B, the actual capacity requirements of Cell 1 and Cell 2 are small, the CPU resource are wasted.

The method according to various embodiments may be used to dynamically adjust the cell capacity configuration of each cell, thus it ensures that the overall capacity of all cells is optimal, thereby supporting more cells and reducing the cost of a single cell base station.

Figure 18A:
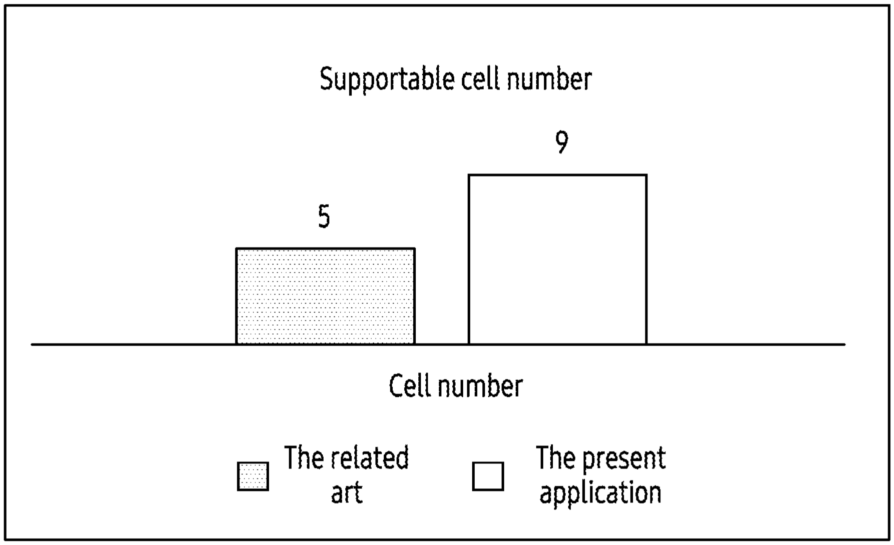
FIGS. 18A and 18B are diagrams illustrating an effect comparison between the existing method and the method of the present disclosure for the example scenario shown in FIG. 17 according to various embodiments.
Figure 18B:
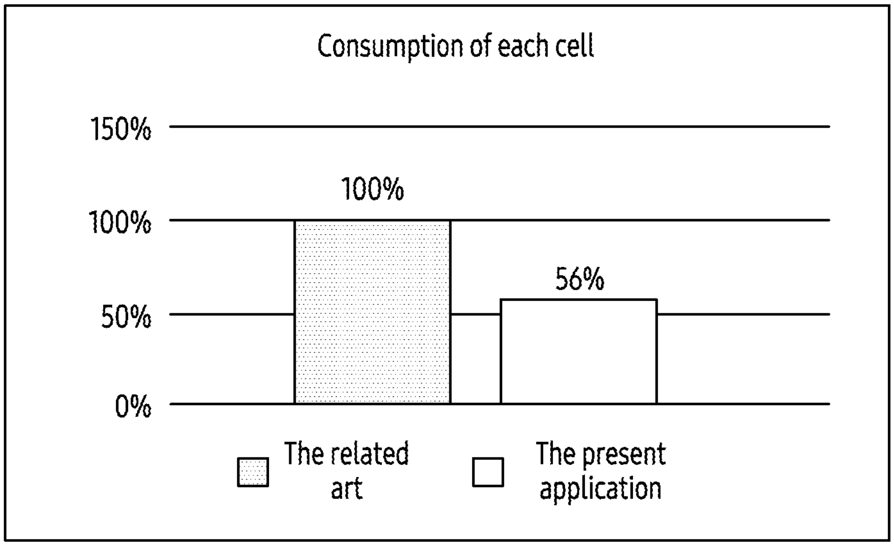

As shown in FIGS. 18A and 18B, compared with the traditional solution (the static cell capacity configuration), the method according to various embodiments improves the overall CPU usage rate of the base station by 44%, and with the maximum cell support capacity unchanged, the number of cells supported by a single base station increases by 80% (5→9), and there is no phenomenon that the respective functional modules of the cells crash due to the use of CPU by them exceeding the specific constraint.

Figure 19:
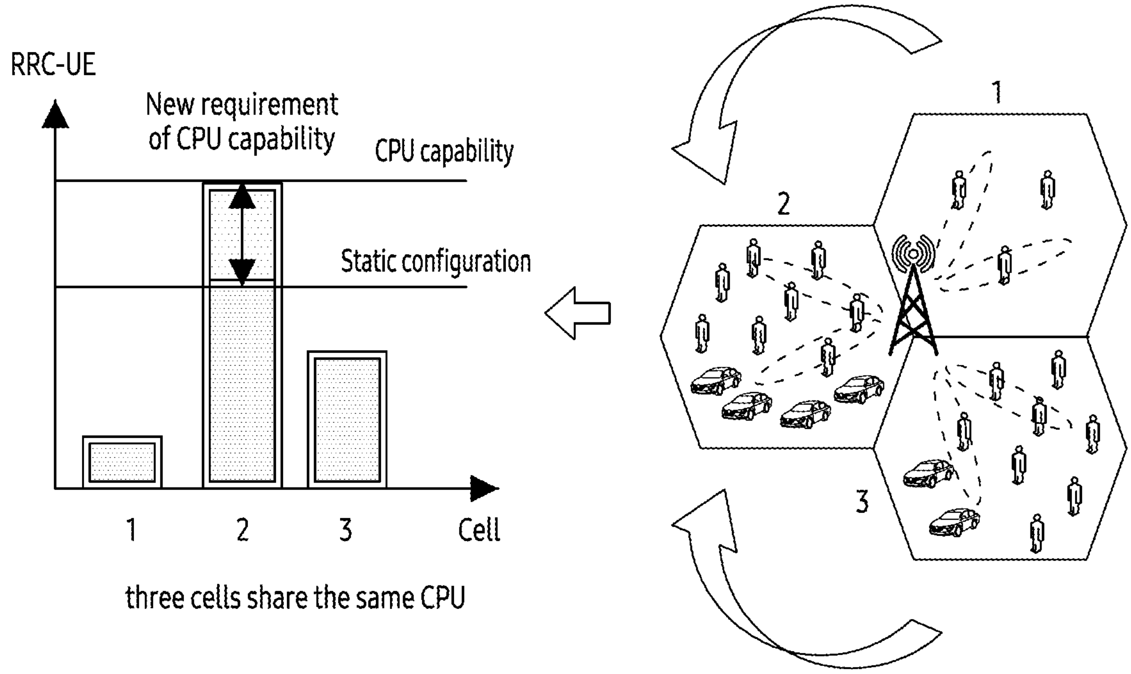
FIG. 19 is a diagram illustrating another example scenario for comparing the existing method with the method of the present disclosure according to various embodiments.

Scenario 2: When the static cell capacity configuration is adopted in each cell, the base station cannot meet the requirement of dynamic change in the real-time cell capacity requirement of each cell with capacity configuration of each cell remain unchanged. As shown in FIG. 19, when the real-time cell capacity requirements of the respective cells change in different time periods, for the static cell capacity configuration, it will result in a full load of resource for one cell and redundancy of resource for another cell under the same base station (within the same CPU), which will result in poor user experience in heavily loaded cells (including intermittent voice calls, low download rate, poor web browsing/game/video experience, etc.) and waste of CPU resource (overall capacity of the base station) in heavily loaded cells (because idle cells still occupy fixed CPU resource due to a fixed resource configuration, and no users needs cell scheduling).

With respect to Scenario 2, various example embodiments adjust the current capacity requirements of the respective cells dynamically by dynamically monitoring the resource requirement, to ensure that the total CPU resource of the three cells is met while dynamically improving the cell capacity configuration of Cell 2 to meet the real-time requirement. The results of comparing the method according to various embodiments with the related art are shown in Table 3 below (assuming that each CPU includes 3 cells):

TABLE 3

| Method of related art | Method according to various embodiments |
|---|---|
| Cell 1: {400, 128, 42, 16} | Cell 1: {150, 64, 24, 4} |
| Cell 2: {400, 128, 42, 16} | Cell 2: {500, 128, 42, 16} |
| Cell 3: {400, 128, 42, 16} | Cell 3: {300, 64, 32, 8} |

Scenario 3: When a software version of the base station is updated iteratively, because the hardware resource occupation and a configuration of the software modules have a nonlinear relationship, for the cell capacity configuration that has been set by the respective cells, which may no longer be applicable to the updated version of the base station, and the final configuration result of each test cannot be guaranteed to be the best solution, and cannot be predicted through a fixed formula, it may only be reconfigured through a large number of multi-dimensional configuration tests, which will consume a lot of manpower and material resources, the work is highly repetitive, the efficiency of this solution is low, and the product update cycle will also be affected.

With respect to scenario 3, the method according to various embodiments may find the updated optimal solution on the basis of the original training model, and based on the continuous iterative training of the neural network model, the corresponding relationship between the use of hardware resources and the configuration of software modules may also be adjusted in time with respect to the update of software. Under the same effect as the traditional manpower testing, the use of machines instead of manpower may greatly reduce the cost of manpower, and no longer have a negative impact on the product version iteration cycle. An analysis is as follows:

(1) As shown in Table 1 above, in the multi-dimensional configuration parameter test, the number of test cases increases exponentially. In order to avoid consuming too much manpower and material resources, only sampling tests may be performed. Even if this method is used, it also requires a long time of manpower to perform this repetitive test, moreover, the configuration value of sampling at a fixed interval does not guarantee the effective use of resources, but the scheme based on the neural network model according to various embodiments may perfectly replace the traditional test, and the neural network model may also relatively accurately obtain a non-linear corresponding relationship between the hardware resource occupation and the configuration of software modules, thus improving the configuration accuracy;

(2) Realizing the dynamic resource adjustment of the respective cells must rely on the non-linear corresponding relationship between the hardware resource occupation and the configuration of software modules provided by the neural network model, to improve an overall capacity of the base station while ensuring the normal use of CPU resource.

Figure 20:
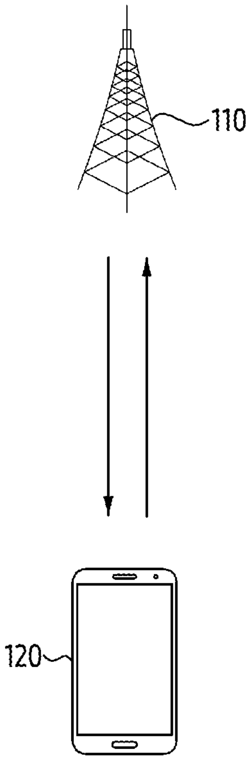
FIG. 20 illustrates a wireless communication system according to an embodiment of the disclosure.

FIG. 20 illustrates a wireless communication system according to an embodiment of the disclosure.

Referring to FIG. 20, it illustrates a base station 110 and a terminal 120 as parts of nodes using a wireless channel in a wireless communication system. Although FIG. 20 illustrates only one base station, the wireless communication system may further include another base station that is the same as or similar to the base station 110.

The base station 110 is a network infrastructure that provides wireless access to the terminal 120. The base station 110 may have a coverage defined based on a distance capable of transmitting a signal. In addition to the term 'base station', the base station 110 may be referred to as 'access point (AP), 'eNodeB (eNB)', '5th generation node', 'next generation nodeB (gNB)', 'wireless point', 'transmission/reception', or other terms having the same or equivalent meaning thereto.

The terminal 120, which is a device used by a user, performs communications with the base station 110 through a wireless channel. A link from the base station 110 to the terminal 120 is referred to as a downlink (DL), and a link from the terminal 120 to the base station 110 is referred to as an uplink (UL). Further, although not shown in FIG. 20, the terminal 120 and other terminals may perform communications with each other through the wireless channel. In this context, a link between the terminal 120 and another terminals (device-to-device link, D2D) is referred to as a side link, and the side link may be used mixed with a PC5 interface. In some other embodiments of the disclosure, the terminal 120 may be operated without any user's involvement. According to an embodiment of the disclosure, the terminal 120 is a device that performs machine-type communication (MTC) and may not be carried by a user. In addition, according to an embodiment of the disclosure, the terminal 120 may be a narrowband (NB)-Internet of things (IoT) device.

The terminal 120 may be referred to as 'user equipment (UE), 'customer premises equipment (CPE), 'mobile station', 'subscriber station', 'remote terminal', 'wireless terminal', 'electronic device', 'user device', or any other term having the same or equivalent technical meaning thereto.

The base station 110 may perform beamforming with the terminal 120. The base station 110 and the terminal 120 may transmit and receive radio signals in a relatively low frequency band (e.g., FR 1 (frequency range 1) of NR). Further, the base station 110 and the terminal 120 may transmit and receive radio signals in a relatively high frequency band (e.g., FR 2 of NR (or FR 2-1, FR 2-2, FR 2-3), FR 3, or millimeter wave (mmWave) bands (e.g., 28 GHz, 30 GHz, 38 GHz, 60 GHz)). In order to improve the channel gain, the base station 110 and the terminal 120 may perform beamforming. In this context, the beamforming may include transmission beamforming and reception beamforming. The base station 110 and the terminal 120 may assign directionality to a transmission signal or a reception signal. To that end, the base station 110 and the terminal 120 may select serving beams through a beam search or beam management procedure. After the serving beams are selected, subsequent communication may be performed through a resource having a QCL relationship with a resource that has transmitted the serving beams.

A first antenna port and a second antenna port may be evaluated to be in such a QCL relationship, if the wide-scale characteristics of a channel carrying symbols on the first antenna port can be estimated from a channel carrying symbols on the second antenna port. For example, the wide-scale characteristics may include at least one of delay spread, Doppler spread, Doppler shift, average gain, average delay, and spatial receiver parameters.

Although in FIG. 20, both the base station 110 and the terminal 120 are described as performing beamforming, embodiments of the disclosure are not necessarily limited thereto. In some embodiments of the disclosure, the terminal may or may not perform beamforming. Likewise, the base station may or may not perform beamforming. That is to say, only either one of the base station and the terminal may perform beamforming, or both the base station and the terminal may not perform beamforming.

In the disclosure, a beam means a spatial flow of a signal in a radio channel, and may be formed by one or more antennas (or antenna elements), of which formation process may be referred to as beamforming. The beamforming may include at least one of analog beamforming and digital beamforming (e.g., precoding). Reference signals transmitted based on beamforming may include, for example, a demodulation-reference signal (DM-RS), a channel state information-reference signal (CSI-RS), a synchronization signal/physical broadcast channel (SS/PBCH), or a sounding reference signal (SRS). Further, for a configuration for each reference signal, an IE, such as a CSI-RS resource, an SRS-resource, or the like may be used, and the configuration may include information associated with a beam. Beam-associated information may refer to whether a corresponding configuration (e.g., CSI-RS resource) uses the same spatial domain filter as other configuration (e.g., another CSI-RS resource within the same CSI-RS resource set) or uses a different spatial domain filter, or with which reference signal is quasi-co-located (QCL), or if QCLed, what type (e.g., QCL type A, B, C, or D) it has.

According to the related art, in a communication system with a relatively large cell radius of a base station, each base station was installed so that the respective base station includes functions of a digital processing unit (or distributed unit (DU)) and a radio frequency (RF) processing unit (or radio unit (RU)). However, as high-frequency bands are used in 4th generation (4G) systems and/or its subsequent communication systems (e.g., fifth-generation (5G), and the cell coverage of a base station decreased, the number of base stations to cover a certain area has increased. Thus, it led to more increased burden of initial installation costs for communication providers to install more base stations. In order to minimize the installation costs of the base station, a structure has been proposed in which the DU and the RU of the base station are separated so that one or more RUs are connected to one DU through a wired network and one or more RUs geographically distributed are arranged to cover a specific area. Hereinafter, deployment structures and extension examples of base stations according to various embodiments of the disclosure will be described with reference to FIG. 21.

Figure 21:
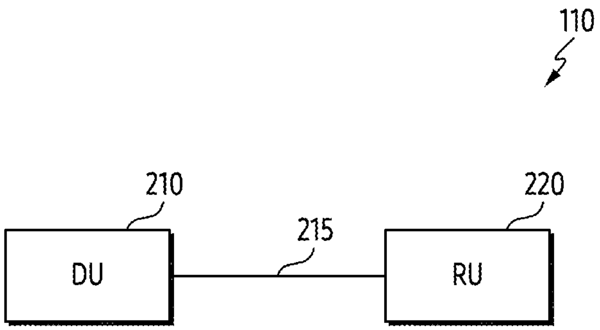
FIG. 21 illustrates a fronthaul interface according to an embodiment of the disclosure.

FIG. 21 illustrates a fronthaul interface according to an embodiment of the disclosure.

A fronthaul refers to entities between a wireless LAN and a base station, as opposed to a backhaul between a base station and a core network.

Although FIG. 21 illustrate an example of a fronthaul structure between the DU 210 and one RU 220, it is only for convenience of description and the disclosure is not limited thereto. In other words, an embodiment of the disclosure may also be applied to a fronthaul structure between one DU and a plurality of RUs. For example, an embodiment of the disclosure may be applied to a fronthaul structure between one DU and two RUs. Further, an embodiment of the disclosure may be also applied to a fronthaul structure between one DU and three RUs.

Referring to FIG. 21, the base station 110 may include a DU 210 and an RU 220. The fronthaul 215 between the DU 210 and the RU 220 may be operated through an $F_x$ interface. For the operation of the fronthaul 215, an interface, such as e.g., an enhanced common public radio interface (eCPRI) or a radio over ethernet (ROE) may be used.

Along with development of communication technology, the mobile data traffic has increased a great deal, and thus, the bandwidth requirement demanded by the fronthaul between the digital unit (DU) and the radio unit (RU) has increased significantly. In a deployment, such as a centralized/cloud radio access network (C-RAN), the DU may be implemented to perform the functions for packet data convergence protocol (PDCP), radio link control (RLC), media access control (MAC), and physical (PHY), and the RU may be implemented to further perform the functions for a PHY layer in addition to the radio frequency (RF) function.

The DU 210 may serve as an upper layer of a wireless network. For example, the DU 210 may perform a function of a MAC layer and a part of the PHY layer. Here, the part of the PHY layer is performed at a higher level amongst the functions of the PHY layer, and may include, for example, channel encoding (or channel decoding), scrambling (or descrambling), modulation (or demodulation), or layer mapping (or layer de-mapping). According to an embodiment of the disclosure, when the DU 210 conforms to the O-RAN standard, it may be referred to as an O-DU (O-RAN DU). The DU 210 may be represented replaced by a first network entity for a base station (e.g., gNB) in embodiments of the disclosure, as occasion demands.

The RU 220 may be responsible for lower layer functions of the wireless network. For example, the RU 220 may perform a part of the PHY layer and the RF function. Here, the part of the PHY layer is performed at a relatively lower level than the DU 210 amongst functions of the PHY layer, and may include, for example, iFFT transform (or FFT transform), CP insertion (CP removal), and digital beamforming. The RU 220 may be referred to as 'access unit (AU)', 'access point (AP)', 'transmission/reception point (TRP)', 'remote radio head (RRH)', 'radio unit (RU)', or any other terms having an equivalent technical meaning thereto. According to an embodiment of the disclosure, when the RU 220 conforms to the O-RAN standard, it may be referred to as an O-RU (O-RAN RU). The RU 220 may be represented replaced by a second network entity for a base station (e.g., gNB) in embodiments of the disclosure, as circumstance demands.

Although FIG. 21 describes that the base station 110 includes the DU 210 and the RU 220, the embodiments of the disclosure are not limited thereto. The base station according to embodiments of the disclosure may be implemented with a distributed deployment according to a centralized unit (CU) configured to perform a function of upper layers (e.g., packet data convergence protocol (PDCP), radio resource control (RRC)) of an access network, and a distributed unit (DU) configured to perform a function of a lower layer. In this occasion, the distributed unit (DU) may include a digital unit (DU) and a radio unit (RU) of FIG. 21. Between the core (e.g., 5G core (5GC) or next generation core (NGC)) network and the radio network (RAN), the deployment of the base station may be implemented in the order of CU, DU, and RU. The interface between the CU and the distributed unit (DU) may be referred to as an F1 interface.

The centralized unit (CU) may be connected to one or more DUs to act as a higher layer than the DU. For example, the CU may be responsible for the functions of radio resource control (RRC) and packet data convergence protocol (PDCP) layers, and the DU and the RU may be responsible for the functions of lower layers. The DU may perform some functions (high PHY) of the radio link control (RLC), the media access control (MAC), and the physical (PHY) layers, and the RU may be responsible for the remaining functions (low PHY) of the PHY layer. Further, as an example, the digital unit (DU) may be included in the distributed unit (DU) according to implementation of a distributed arrangement of the base station. Hereinafter, unless otherwise defined, the operations of the digital unit (DU) and the RU will be described, but it is to be noted that various embodiments of the disclosure may be applied to both a base station deployment including the CU or a deployment in which the DU is directly connected to a core network, that is, being incorporated into a base station (e.g., an NG-RAN node) where the CU and the DU are one entity.

Figure 22A:
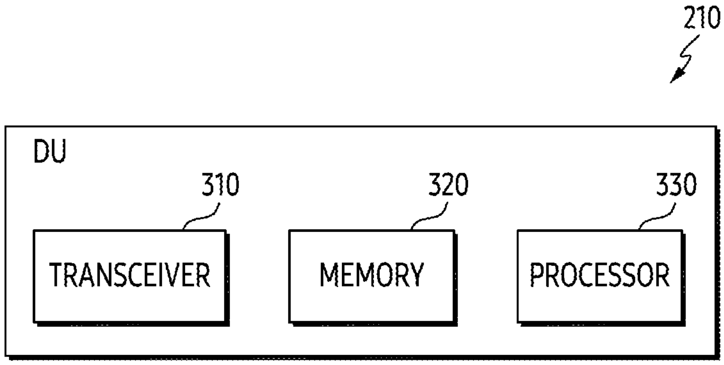
FIG. 22A illustrates a functional configuration of a distributed unit (DU) according to an embodiment of the disclosure.

FIG. 22A illustrates a functional configuration of a distributed unit (DU) according to an embodiment of the disclosure.

The configuration illustrated in FIG. 22A may be understood as a configuration of the DU 210 of FIG. 21 as a part of the base station. As used herein, the terms '~ module', '~ unit', or '~ part' mean a unit for processing at least one function or operation, which may be implemented by hardware, software, or a combination of hardware and software.

Referring to FIG. 22A, the DU 210 includes a transceiver 310, a memory 320, and a processor 330.

The transceiver 310 may perform functions for transmitting and/or receiving signals in a wired communication environment. The transceiver 310 may include a wired interface for controlling a direct connection between a device and another device through a transmission medium (e.g., copper wire, optical fiber, etc.). For example, the transceiver 310 may transmit an electrical signal to other device through a copper wire or perform a conversion between an electrical signal and an optical signal. The DU 210 may communicate with a radio unit (RU) via the transceiver 310. The DU 210 may be connected to a core network or a distributed CU via transceiver 310.

The transceiver 310 may perform the functions for transmitting and receiving signals in a wireless communication environment. For example, the transceiver 310 may perform a function for conversion between a baseband signal and a bit string according to a physical layer standard of a system. For example, upon data transmission, the transceiver 310 generates complex symbols by encoding and modulating a transmit bit string. Further, upon data reception, the transceiver 310 restores the received bit string through demodulation and decoding of the baseband signal. Further, the transceiver 310 may include a plurality of transmission/reception paths. Furthermore, according to an embodiment of the disclosure, the transceiver 310 may be connected to a core network or connected to other nodes (e.g., integrated access backhaul (IAB).

The transceiver 310 is configured to transmit and receive signals. For example, the transceiver 310 may transmit a management plane (M-plane) message. For example, the transceiver 310 may transmit a synchronization plane (S-plane) message. For example, the transceiver 310 may transmit a control plane (C-plane) message. For example, the transceiver 310 may transmit a user plane (U-plane) message. For example, the transceiver 310 may receive the user plane message. Although only the transceiver 310 is illustrated in FIG. 22A, the DU 210 may include two or more transceivers, according to another embodiment.

The transceiver 310 transmits and receives signals as described above. Accordingly, all or at least part of the transceiver 310 may be also referred to as a communication unit, a transmission unit, a reception unit, or a transmission/reception unit. Further, throughout the description, it is to be noted that transmission and reception performed via a wireless channel are intended to include the aforementioned processing performed by the transceiver 310.

Although not shown in FIG. 22A, the transceiver 310 may further include a backhaul transceiver for connection with a core network or another base station. The backhaul transceiver provides an interface for performing communication with other nodes in the network. In other words, the backhaul transceiver converts a bit string transmitted from a base station to another node, for example, another access node, another base station, a higher node, a core network or the like, into a physical signal and converts the physical signal received from the other node into a bit string.

The memory 320 stores data, such as a basic program, an application program, and setting information for an overall operation of the DU 210. The memory 320 may be referred to as a storage unit. The memory 320 may be configured of a volatile memory, a nonvolatile memory, or a combination of a volatile memory and a nonvolatile memory. Further, the memory 320 provides stored data according to a request of the processor 330.

The processor 330 controls the overall operations of the DU 210. The processor 380 may be referred to as a controller. For example, the processor 330 transmits and receives signals through the transceiver 310 (or via a backhaul communication unit). Further, the processor 330 records and reads data into/from the memory 320. Further, the processor 330 may perform functions of a protocol stack required by the communication standard. Although only the processor 330 is illustrated in FIG. 22A, the DU 210 may include two or more processors, according to an example of another implementation.

The configuration of the DU 210 illustrated in FIG. 22A is only of an example, and a configuration of the DU performing the embodiments of the disclosure is not limited to the configuration illustrated in FIG. 22A. In some embodiments of the disclosure, some of the configuration may be added, deleted, or changed.

Figure 22B:
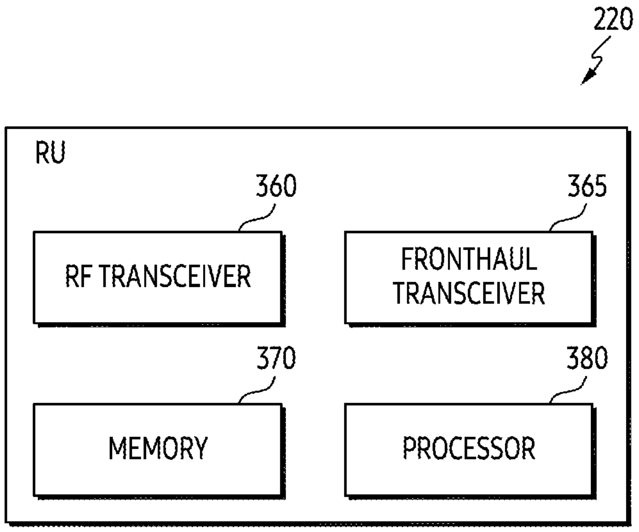
FIG. 22B illustrates a functional configuration of a radio unit (RU) according to an embodiment of the disclosure.

FIG. 22B illustrates a functional configuration of a radio unit (RU) according to an embodiment of the disclosure.

The configuration illustrated in FIG. 22B may be understood as a configuration of the RU 220 of FIG. 21, as a part of the base station. As used herein, the terms, such as '~ module', '~ unit', or '~ part' mean a unit for processing at least one function or operation, which may be implemented by hardware, software, or a combination of hardware and software.

Referring to FIG. 22B, the RU 220 includes an RF transceiver 360, a fronthaul transceiver 365, a memory 370, and a processor 380.

The RF transceiver 360 performs the functions for transmitting and receiving signals through a wireless channel. For example, the RF transceiver 360 up-converts a baseband signal into an RF band signal to transmit the RF band signal through an antenna, and down-converts the RF band signal received through the antenna into the baseband signal. For example, the RF transceiver 360 may include a transmission filter, a reception filter, an amplifier, a mixer, an oscillator, a DAC, an ADC, or the like.

The RF transceiver 360 may include a plurality of transmission/reception paths. Furthermore, the RF transceiver 360 may include an antenna unit. The RF transceiver 360 may include at least one antenna array configured with a plurality of antenna elements. In terms of hardware, the RF transceiver 360 may be configured with a digital circuit and an analog circuit (e.g., radio frequency integrated circuit (RFIC)). Here, the digital circuit and the analog circuit may be implemented in a single package. Further, the RF transceiver 360 may include a plurality of RF chains. The RF transceiver 360 may perform beamforming. The RF transceiver 360 may apply a beamforming weight to a signal to be transmitted/received for assigning directionality according to the setting of the processor 380. According to an embodiment of the disclosure, the RF transceiver 360 may include a radio frequency (RF) block (or an RF part).

According to an embodiment of the disclosure, the RF transceiver 360 may transmit and receive the signal over a radio access network. For example, the RF transceiver 360 may transmit a downlink signal. The downlink signal may include a synchronization signal (SS), a reference signal (RS) (e.g., cell-specific reference signal (CRS), DM (demodulation)-RS), system information (e.g., MIB, SIB, RMSI (remaining system information), OSI (other information), configuration messages, control information, or downlink data. Further, for example, the RF transceiver 360 may receive an uplink signal. The uplink signal may include a random access related signal (e.g., random access preamble (RAP) (or Msg1 (message 1), Msg3 (message 3)), a reference signal (e.g., sounding reference signal (SRS), DM-RS), a power headroom report (PHR) or the like. Although only the RF transceiver 360 is illustrated in FIG. 22B, the RU 220 may include two or more RF transceivers, according to another implementation example.

According to embodiments of the disclosure, the RF transceiver 360 may transmit RIM-RS. The RF transceiver 360 may transmit a first type of RIM-RS (e.g., RIM-RS type 1 of 3GPP) for notifying detection of far-field interference. The RF transceiver 360 may transmit a second type of RIM-RS (e.g., RIM-RS type 2 of 3GPP) for notifying presence or absence of the far-field interference.

The fronthaul transceiver 365 may transmit and receive a signal. According to an embodiment of the disclosure, the fronthaul transceiver 365 may transmit and receive the signal on a fronthaul interface. For example, the fronthaul transceiver 365 may receive a management plane (M-plane) message. For example, the fronthaul transceiver 365 may receive a synchronization plane (S-plane) message. For example, the fronthaul transceiver 365 may receive a control plane (C-plane) message. For example, the fronthaul transceiver 365 may transmit a user plane (U-plane) message. For example, the fronthaul transceiver 365 may receive the user plane message. Although only the fronthaul transceiver 365 is illustrated in FIG. 22B, the RU 220 may include two or more fronthaul transceivers, according to another implementation example.

The RF transceiver 360 and the fronthaul transceiver 365 transmit and receive signals as described above. As such, all or at least part of the RF transceiver 360 and the fronthaul transceiver 365 may be referred to as a communication unit, a transmission unit, a reception unit, or a transmission/reception unit. Further, throughout the following disclosure, transmission and reception performed through a radio channel are used to mean that the aforementioned processing is performed by the RF transceiver 360.

The memory 370 stores data, such as a basic program, an application program, and setting information for an overall operation of the RU 220. The memory 370 may be referred to as a storage unit. The memory 370 may be configured with a volatile memory, a nonvolatile memory, or a combination of a volatile memory and a nonvolatile memory. Further, the memory 370 provides stored data according to a request of the processor 380. According to an embodiment of the disclosure, the memory 370 may include a memory for storing conditions, instructions, or set values related to the SRS transmission scheme.

The processor 380 controls the overall operations of the RU 220. The processor 380 may be referred to as a controller. For example, the processor 380 transmits and receives signals through the RF transceiver 360 or the fronthaul transceiver 365. Further, the processor 380 writes and reads data into/from the memory 370. Then, the processor 380 may perform the functions of the protocol stack required by the communication standard. Although only the processor 380 is illustrated in FIG. 22B, the RU 220 may include two or more processors, according to another implementation example. The processor 380 may include a storage space for storing instructions/codes that are at least temporarily residing in the processor 380, as the instructions/codes being an instruction set or code stored in the memory 370. The processor 380 may further include various communication modules for performing communication.

The processor 380 may control the RU 220 to perform operations according to the following embodiments of the disclosure.

The configuration of the RU 220 illustrated in FIG. 22B is only of an example, and the example of the RU performing the embodiments of the disclosure is not limited to the configuration illustrated in FIG. 22B. In some configurations, some of the configuration may be added, deleted, or changed.

Although components of the DU-RU are shown and described as being separated, implementation examples are not limited thereto. As an implementation example of the present disclosure, of course, one device including a DU and an RU may perform operations of a base station.

According to embodiments, a method performed by a network node, comprises acquiring cell capacity information of a plurality of cells corresponding to a Distributed Unit (DU) of a base station. The method comprises determining cell capacity summations corresponding to the DU based on each cell corresponding to different cell capacities, based on the cell capacity information. The method comprises determining a predicted cell capacity of the plurality of cells based on the cell capacity summations, for the base station allocating a cell capacity with respect to each of the plurality of cells according to the predicted cell capacity.

In an embodiment, the cell capacity summations satisfying the set condition includes a maximum cell capacity summation among the respective determined cell capacity summations.

In an embodiment, the cell capacity information comprises a target cell capacity. The determining the cell capacity summations corresponding to the DU based on each cell corresponding to the different cell capacities, based on the cell capacity information, comprises determining a weight of each cell capacity parameter in a current cell capacity corresponding to each cell, based on a target cell capacity corresponding to each cell and the current cell capacity corresponding to each cell. The determining the cell capacity summations corresponding to the DU based on each cell corresponding to the different cell capacities, based on the cell capacity information, comprises determining a current cell capacity summation corresponding to the DU, based on the current cell capacity corresponding to each cell and the weight of each cell capacity parameter in the current cell capacity corresponding to each cell.

In an embodiment, wherein the target cell capacity of each cell is determined using an actual cell capacity of the corresponding cell in a current specified period and a target cell capacity of the corresponding cell estimated in a previous specified period.

In an embodiment, the determining the predicted cell capacity of the plurality of cells, based on the cell capacity summation satisfying the set condition, comprises determining whether a current cell capacity summation corresponding to the DU satisfies the set condition. The determining the predicted cell capacity of the plurality of cells, based on the cell capacity summation satisfying the set condition, comprises based on the current cell capacity summation corresponding to the DU satisfying the set condition, determining the current cell capacity corresponding to each cell as the predicted cell capacity of the plurality of cells. The determining the predicted cell capacity of the plurality of cells, based on the cell capacity summation satisfying the set condition, comprises based on the current cell capacity summation corresponding to the DU not satisfying the set condition, updating the current cell capacity corresponding to each cell, and determining a current cell capacity summation corresponding to the DU based on the updated current cell capacity of each cell.

In an embodiment, wherein the determining whether the current cell capacity summation corresponding to the DU satisfies the set condition comprises confirming that the current cell capacity summation satisfies the set condition, based on the difference, between the current cell capacity summation corresponding to the DU and a cell capacity summation corresponding to the DU determined last time, not being greater than a set threshold, or the number of updates of cell capacities reaching an upper limit of the number of updates.

In an embodiment, the updating the current cell capacity corresponding to each cell comprises predicting a Central Processing Unit (CPU) resource occupied by each time sensitive module of processing modules of each cell, based on the current cell capacity corresponding to each cell. The updating the current cell capacity comprises updating the current cell capacity corresponding to each cell based on the predicted CPU resource occupied by each time sensitive module of each cell.

In an embodiment, wherein the updating the current cell capacity corresponding to each cell based on the predicted CPU resource occupied by each time sensitive module of each cell, comprises updating the current cell capacity corresponding to each cell based on the CPU resource occupied by each time sensitive module of each cell not being greater than a corresponding upper limit of resource occupation.

In an embodiment, wherein the predicting the CPU resource occupied by each time sensitive module in the processing modules of each cell, based on the current cell capacity corresponding to each cell, comprises using a neural network model to predict the CPU resource occupied by each time sensitive module in the processing modules of each cell, based on the current cell capacity corresponding to each cell.

In an embodiment, the method further comprises determining idle CPU resource of the DU based on the predicted cell capacity of the plurality of cells, for the base station allocating CPU resource with respect to time insensitive modules of the plurality of cells according to the idle CPU resource.

In an embodiment, the determining the idle CPU resource of the DU based on the predicted cell capacity of the plurality of cells comprises, using a neural network model to determine a CPU resource occupied by time sensitive modules in the processing modules of each cell, based on the predicted cell capacity of the plurality of cells. The determining the idle CPU resource of the DU based on the predicted cell capacity of the plurality of cells comprises determining the idle CPU resource of the DU based on the CPU resource occupied by the time sensitive modules and a start time of running of the time sensitive modules.

In an embodiment, the determining the idle CPU resource of the DU comprises determining an end time of running of the time sensitive modules, based on the CPU resource occupied by the time sensitive modules and the start time of running of the time sensitive modules. The determining the idle CPU resource of the DU comprises determining the idle CPU resource, based on the start time and end time of running of the time sensitive modules adjacent in time sequence.

In an embodiment, the method further comprises training the neural network model based on an actual cell capacity of each cell and information on the occupied CPU resource corresponding to the actual cell capacity.

In an embodiment, wherein the cell capacity comprises at least one of: a maximum supportable User Equipment (UE) number; a maximum supportable UE number with Sounding Reference Signal (SRS) configuration; a maximum supportable Multi-User (MU) scheduling candidate UE number; a maximum supportable MU layer number.

In an embodiment, wherein the network node comprises a base station, a Radio Access Network Intelligent Controller (RIC) in an Open Radio Access Network (O-RAN).

In an embodiment, the acquiring the cell capacity information of the plurality of cells corresponding to the DU of the base station comprises, acquiring the cell capacity information of the corresponding plurality of cells from the DU of the base station. The method further comprises transmitting the predicted cell capacity to the base station, for the base station allocating the cell capacity with respect to each of the plurality of cells according to the predicted cell capacity.

In an embodiment, wherein the cell capacity information comprises at least one of: an actual cell capacity of a cell, the information on the occupied CPU resource corresponding to the actual cell capacity, and a target cell capacity of the cell.

According to embodiments, a device of a network node, comprises at least one transceiver. The device comprises at least one processor coupled to the at least one transceiver. The at least one processor is configured to acquire cell capacity information of a plurality of cells corresponding to a Distributed Unit (DU) of a base station. The at least one processor is configured to determine cell capacity summations corresponding to the DU based on each cell corresponding to different cell capacities, based on the cell capacity information. The at least one processor is configured to determine a predicted cell capacity of the plurality of cells based on the cell capacity summations, for the base station allocating a cell capacity with respect to each of the plurality of cells according to the predicted cell capacity.

According to embodiments, a non-transitory computer-readable storage medium having stored thereon program instructions, the instructions, when executed by a processor, perform operations includes acquiring cell capacity information of a plurality of cells corresponding to a Distributed Unit (DU) of a base station. The instructions, when executed by the processor, perform operations includes determining cell capacity summations corresponding to the DU based on each cell corresponding to different cell capacities, based on the cell capacity information. The instructions, when executed by a processor, perform operations includes determining a predicted cell capacity of the plurality of cells based on the cell capacity summations, for the base station allocating a cell capacity with respect to each of the plurality of cells according to the predicted cell capacity.

According to embodiments, a method performed by a base station, comprises acquiring a predicted cell capacity of a plurality of cells corresponding to a Distributed Unit (DU) of the base station, determined based on the cell capacity related information of the plurality of cells corresponding to the DU. The method comprises allocating a cell capacity with respect to each of the plurality of cells according to the predicted cell capacity.

In an embodiment, wherein the allocating the cell capacity with respect to each of the plurality of cells according to the predicted cell capacity comprises determining a priority of each of the plurality of cells corresponding to the DU. The allocating the cell capacity with respect to each of the plurality of cells according to the predicted cell capacity comprises allocating a cell capacity with respect to each cell, using the predicted cell capacity, according to the priority of each cell.

In an embodiment, the allocating the cell capacity with respect to each cell, using the predicted cell capacity, according to the priority of each cell, comprises, according to the priority of each cell, performing, with respect to each cell successively based on a priority of a current cell being a high priority, or based on the priority of the current cell being a low priority and the remaining CPU resource not being less than a specified threshold, allocating a cell capacity for the current cell based on the predicted cell capacity, and updating the remaining CPU resource. The allocating the cell capacity with respect to each cell, using the predicted cell capacity, according to the priority of each cell, comprises, according to the priority of each cell, performing, with respect to each cell successively based on the priority of the current cell being a low priority and the remaining CPU resource being less than the specified threshold, determining an updated cell capacity of the current cell based on the remaining CPU resource, allocating the cell capacity for the current cell based on the updated cell capacity, and updating the remaining CPU resource.

In an embodiment, the method further comprises acquiring idle CPU resource of the DU, determined based on the predicted cell capacity. The method further comprises allocating the idle CPU resource of the DU with respect to time insensitive modules of the processing modules of each cell, according to the idle CPU resource of the DU.

In an embodiment, the allocating the idle CPU resource of the DU with respect to the time insensitive modules of the processing modules of each cell, according to the idle CPU resource of the DU, comprises splitting time insensitive modules in the processing modules of each cell to obtain a plurality of time insensitive sub-modules for the plurality of cells. The allocating the idle CPU resource of the DU with respect to the time insensitive modules of the processing modules of each cell, according to the idle CPU resource of the DU, comprises allocating the idle CPU resource of the DU with respect to each of the plurality of time insensitive sub-modules, according to the idle CPU resource of the DU.

In addition, according to various embodiments, an electronic apparatus may further be provided, which includes at least one processor; and at least one memory storing computer executable instructions, wherein the computer executable instructions, when being executed by at least one processor, cause the at least one processor to perform the method performed by the network node or the method performed by the base station described above.

At least one of the above plurality of modules may be implemented through the AI model. Functions associated with AI may be performed by non-volatile memory, volatile memory, and processors.

As an example, the electronic apparatus may be a PC computer, a tablet device, a personal digital assistant, a smart phone, or other devices capable of executing the above set of instructions. The electronic apparatus does not have to be a single electronic apparatus and may also be any device or a collection of circuits that may execute the above instructions (or instruction sets) individually or jointly. The electronic apparatus may also be a part of an integrated control system or a system manager, or may be configured as a portable electronic apparatus interconnected by an interface with a local or remote (e.g., via wireless transmission). A processor may include one or more processors. The one or more processors may be a general-purpose processor, such as central processing unit (CPU), application processor (AP), etc., and a processor used only for graphics (such as, graphics processing unit (GPU), visual processing unit (VPU), and/or AI dedicated processor (such as, neural processing unit (NPU)). The one or more processors control the processing of input data according to predefined operation rules or AI models stored in a non-volatile memory and a volatile memory. The predefined operation rules or AI models may be provided through training or learning. Here, providing by learning may refer, for example, to the predefined operation rules or AI models with desired characteristics being formed by applying a learning algorithm to a plurality of learning data. The learning may be performed in the apparatus itself executing AI according to the embodiment, and/or may be implemented by a separate server/apparatus/system.

A learning algorithm may include a method that uses a plurality of learning data to train a predetermined target apparatus (for example, a robot) to enable, allow, or control the target apparatus to make a determination or prediction. Examples of the learning algorithm include, but are not limited to, supervised learning, unsupervised learning, semi supervised learning, or reinforcement learning.

The AI models may be obtained through training. Here, "obtained through training" may refer, for example, to training a basic AI model with a plurality of training data through a training algorithm to obtain the predefined operation rules or AI models, which are configured to perform the required features (or purposes).

As an example, the AI models may include a plurality of neural network layers. Each of the plurality of neural network layers includes a plurality of weight values, and a neural network calculation is performed by performing a calculation between the calculation results of the previous layer and the plurality of weight values. Examples of the neural network include, but are not limited to, convolution neural network (CNN), depth neural network (DNN), recurrent neural network (RNN), restricted Boltzmann machine (RBM), depth confidence network (DBN), bidirectional recursive depth neural network (BRDNN), generative countermeasure network (GAN), and depth Q network.

The processor may execute instructions or codes stored in the memory, where the memory may also store data. Instructions and data may also be transmitted and received through a network via a network interface device, wherein the network interface device may use any known transmission protocol.

The memory may be integrated with the processor as a whole, for example, RAM or a flash memory is arranged in an integrated circuit microprocessor or the like. In addition, the memory may include an independent device, such as an external disk drive, a storage array, or other storage device that may be used by any database system. The memory and the processor may be operatively coupled, or may communicate with each other, for example, through an I/O port, a network connection, or the like, so that the processor may read files stored in the memory.

In addition, the electronic apparatus may also include a video display (such as a liquid crystal display) and a user interaction interface (such as a keyboard, a mouse, a touch input device, etc.). All components of the electronic apparatus may be connected to each other via a bus and/or a network.

According to various embodiments, there may also be provided a non-transitory computer-readable storage medium storing instructions, wherein the instructions, when being executed by at least one processor, cause the at least one processor to execute the above method performed by the network node and the above method performed by the base station according to various embodiments. Examples of the computer-readable storage medium here include: Read Only Memory (ROM), Random Access Programmable Read Only Memory (PROM), Electrically Erasable Programmable Read Only Memory (EEPROM), Random Access Memory (RAM), Dynamic Random Access Memory (DRAM), Static Random Access Memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, Hard Disk Drive (HDD), Solid State Drive (SSD), card storage (such as multimedia card, secure digital (SD) card or extremely fast digital (XD) card), magnetic tape, floppy disk, magneto-optical data storage device, optical data storage device, hard disk, solid state disk and any other devices which are configured to store computer programs and any associated data, data files, and data structures in a non-transitory manner, and provide the computer programs and any associated data, data files, and data structures to the processor or the computer, so that the processor or the computer may execute the computer programs. The instructions and the computer programs in the above computer-readable storage mediums may run in an environment deployed in computer equipment such as a client, a host, an agent device, a server, etc. In addition, in one example, the computer programs and any associated data, data files and data structures are distributed on networked computer systems, so that computer programs and any associated data, data files, and data structures are stored, accessed, and executed in a distributed manner through one or more processors or computers.

It should be noted that the terms "first", "second", "third", "fourth", "1", "2" and the like (if exists) in the description and claims of the disclosure and the above drawings are used to distinguish similar objects, and need not be used to describe a specific order or sequence. It should be understood that data used as such may be interchanged in appropriate situations, so that the embodiments described here may be implemented in an order other than the illustration or text description.

It should be understood that although each operation step is indicated by arrows in the flowcharts of the embodiments, an implementation order of these steps is not limited to an order indicated by the arrows. Unless explicitly stated herein, in some implementation scenarios of the embodiments, the implementation steps in the flowcharts may be executed in other orders according to requirements. In addition, some or all of the steps in each flowchart may include a plurality of sub steps or stages, based on an actual implementation scenario. Some or all of these sub steps or stages may be executed at the same time, and each sub step or stage in these sub steps or stages may also be executed at different times. In scenarios with different execution times, an execution order of these sub steps or stages may be flexibly configured according to requirements, which is not limited by the various embodiments.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a network node, the method comprising:

acquiring cell capacity information indicating target cell capacities for a plurality of cells supported by a distributed unit (DU);

determining cell capacity summations based on the cell capacity information, wherein determining each of the cell capacity summations comprises:

updating a set of current cell capacities for the plurality of cells based on the set of current cell capacities and weights, wherein each of the weights corresponds to a difference between a current cell capacity and a target cell capacity, and determining the cell capacity summation based on the updated set of current cell capacities for the plurality of cells;

determining predicted cell capacity information for a maximum cell capacity summation from among the cell capacity summations, and transmitting, to the DU, the predicted cell capacity information, wherein the predicted cell capacity information is configured to be used to allocate a cell capacity with respect to each of the plurality of cells in the DU.

2. The method of claim 1, wherein the cell capacity summations includes the maximum cell capacity summation among the respective determined cell capacity summations, and wherein the predicted cell capacity information is associated with the maximum cell capacity summation.

3. The method of claim 1, wherein a target cell capacity of each cell is determined using an actual cell capacity of the corresponding cell in a current specified period and a target cell capacity of the corresponding cell estimated in a previous specified period.

4. The method of claim 1, further comprising:

determining whether a current cell capacity summation satisfies a set condition;

based on the current cell capacity summation satisfying the set condition, determining the current cell capacity corresponding to each cell as the predicted cell capacity of the plurality of cells; and based on the current cell capacity summation not satisfying the set condition, updating the current cell capacity corresponding to each cell, and determining a current cell capacity summation corresponding to the DU based on the updated current cell capacity of each cell.

5. The method of claim 4, wherein the determining whether the current cell capacity summation satisfies the set condition comprises:

confirming that the current cell capacity summation satisfies the set condition, based on a difference between the current cell capacity summation and a cell capacity summation determined last time, not being greater than a set threshold, or the number of updates of cell capacities reaching an upper limit of the number of updates.

6. The method of claim 4, wherein the updating the current cell capacity corresponding to each cell comprises:

predicting a central processing unit (CPU) resource occupied by each time sensitive module of processing modules of each cell, based on the current cell capacity corresponding to each cell; and updating the current cell capacity corresponding to each cell based on the predicted CPU resource occupied by each time sensitive module of each cell.

7. The method of claim 6, wherein the updating the current cell capacity corresponding to each cell based on the predicted CPU resource occupied by each time sensitive module of each cell, comprises:

updating the current cell capacity corresponding to each cell based on the CPU resource occupied by each time sensitive module of each cell not being greater than a corresponding upper limit of resource occupation.

8. The method of claim 6, wherein the predicting the CPU resource occupied by each time sensitive module in the processing modules of each cell, based on the current cell capacity corresponding to each cell, comprises:

using a neural network model to predict the CPU resource occupied by each time sensitive module in the processing modules of each cell, based on the current cell capacity corresponding to each cell.

9. The method of claim 1, further comprising:

determining idle CPU resource of the DU based on the predicted cell capacity information, for the DU allocating CPU resource with respect to time insensitive modules of the plurality of cells according to the idle CPU resource.

10. The method of claim 9, wherein the determining the idle CPU resource of the DU based on the predicted cell capacity information comprises:

using a neural network model to determine a CPU resource occupied by time sensitive modules in the processing modules of each cell, based on the predicted cell capacity information; and determining the idle CPU resource of the DU based on the CPU resource occupied by the time sensitive modules and a start time of running of the time sensitive modules.

11. The method of claim 10, wherein the determining the idle CPU resource of the DU comprises:

determining an end time of running of the time sensitive modules, based on the CPU resource occupied by the time sensitive modules and the start time of running of the time sensitive modules; and determining the idle CPU resource, based on the start time and end time of running of the time sensitive modules adjacent in time sequence.

12. The method of claim 8, further comprising:

training the neural network model based on an actual cell capacity of each cell and information on the occupied CPU resource corresponding to the actual cell capacity.

13. The method of claim 1, wherein the cell capacity comprises at least one of:

a maximum supportable user equipment (UE) number; a maximum supportable UE number with sounding reference signal (SRS) configuration; a maximum supportable multi-user (MU) scheduling candidate UE number; a maximum supportable MU layer number.

14. The method of claim 1, wherein the network node corresponds to the DU or a radio access network intelligent controller (RIC) in an open radio access network (O-RAN).

15. The method of claim 1, wherein the acquiring the cell capacity information for the plurality of cells comprises:

acquiring the cell capacity information of the corresponding plurality of cells from the DU, wherein the method further comprises:

transmitting the predicted cell capacity information to the DU, for the DU allocating the cell capacity with respect to each of the plurality of cells according to the predicted cell capacity information.

16. The method of claim 1, wherein the cell capacity information comprises at least one of:

an actual cell capacity of a cell, information on the occupied CPU resource corresponding to the actual cell capacity, and a target cell capacity of the cell.

17. A device of a network node, comprising:

at least one transceiver; and at least one processor, comprising processing circuitry, coupled to the at least one transceiver and configured individually and/or collectively, to:

acquire cell capacity information indicating target cell capacities for a plurality of cells supported by a distributed unit (DU);

determine cell capacity summations based on the cell capacity information, wherein determining each of the cell capacity summations comprises updating a set of current cell capacities for the plurality of cells based on the set of current cell capacities and weights, wherein each of the weights corresponds to a difference between a current cell capacity and a target cell capacity, and determining the cell capacity summation based on the updated set of current cell capacities for the plurality of cells; and determine predicted cell capacity information for a maximum cell capacity summation from among the cell capacity summations; and transmit, to the DU, the predicted cell capacity information, wherein the predicted cell capacity information is configured to be used to allocate a cell capacity with respect to each of the plurality of cells in the DU.

18. The device of claim 17, wherein the cell capacity summations includes the maximum cell capacity summation among the respective determined cell capacity summations, and wherein the predicted cell capacity information is associated with the maximum cell capacity summation.

19. A non-transitory computer-readable storage medium having stored thereon program instructions, the instructions, when executed by at least one processor comprising processing circuitry, individually and/or collectively, perform operations including:

acquiring cell capacity information indicating target cell capacities for a plurality of cells supported by a distributed unit (DU);

determining cell capacity summations based on the cell capacity information, wherein determining each of the cell capacity summations comprises:

updating a set of current cell capacities for the plurality of cells based on the set of current cell capacities and weights, wherein each of the weights corresponds to a difference between a current cell capacity and a target cell capacity, and determining the cell capacity summation based on the updated set of current cell capacities for the plurality of cells;

determining predicted cell capacity information for a maximum cell capacity summation from among the cell capacity summations; and transmitting, to the DU, the predicted cell capacity information, wherein the predicted cell capacity information is configured to be used to allocate a cell capacity with respect to each of the plurality of cells in the DU.

* * * * *